United States Patent
Topliss et al.

(10) Patent No.: US 10,955,677 B1
(45) Date of Patent: Mar. 23, 2021

(54) SCENE CAMERA

(71) Applicant: Apple Inc., Cupertino, CA (US)

(72) Inventors: Richard J. Topliss, Cambridge (GB); Michael David Simmonds, Ashford (GB)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/526,896

(22) Filed: Jul. 30, 2019

Related U.S. Application Data

(60) Provisional application No. 62/715,128, filed on Aug. 6, 2018.

(51) Int. Cl.
*G02B 27/01* (2006.01)
*G06T 19/00* (2011.01)
(Continued)

(52) U.S. Cl.
CPC ............ *G02B 27/0172* (2013.01); *G06T 7/70* (2017.01); *G06T 19/006* (2013.01);
(Continued)

(58) Field of Classification Search
CPC ............ G01C 21/3629; G02B 27/0093; G02B 27/017; G02B 27/0172; G02B 2027/0138; G02B 2027/014; G02B 2027/0178; G02B 2027/0187; G04G 21/025; G04G 21/04; G04G 21/08; G06F 1/163; G06F 3/005;
(Continued)

(56) References Cited

U.S. PATENT DOCUMENTS 8,120,828 B2  2/2012  Schwerdtner
8,686,923 B2  4/2014  Eberl et al.
(Continued)

FOREIGN PATENT DOCUMENTS

EP        0574005        12/1993
WO      2017059379       4/2017
(Continued)

OTHER PUBLICATIONS

U.S. Appl. No. 16/056,198, filed Aug. 6, 2018, Richard J. Topliss.
(Continued)

*Primary Examiner* — Nelson M Rosario
(74) *Attorney, Agent, or Firm* — Kowert, Hood, Munyon, Rankin & Goetzel, P.C.; Robert Kowert

(57) ABSTRACT

Point to point transmission holograms are used to provide a scene camera for an augmented reality glasses display system. A glass or plastic substrate acts as spectacle style lens. A holographic medium is applied to a surface of the substrate, within which is recorded a series of point to point transmission holograms. The construction points of the holograms are arranged at the eye and at the pupil of a camera placed, ideally, to the temple side of the user's eye. The recorded transmission holograms act by diffracting a portion of the light from the scene surrounding the user that is heading for the user's eye towards the scene camera. The hologram efficiency is balanced so that the user is still able to see the surrounding scene. The perspective of the view seen by the scene camera is substantially identical to that seen by the user through the lens.

20 Claims, 15 Drawing Sheets

(51) Int. Cl.
  *G06T 7/70* (2017.01)
  *H04N 5/225* (2006.01)

(52) U.S. Cl.
  CPC ..... *H04N 5/2253* (2013.01); *G02B 2027/014* (2013.01); *G02B 2027/0138* (2013.01); *G02B 2027/0174* (2013.01)

(58) Field of Classification Search
  CPC .......... G06F 3/011; G06F 3/013; G06F 3/016; G06F 3/017; G06F 3/0304; G06F 3/03547; G06F 3/0428; G06F 2203/0331; G06F 2203/0338; G06Q 30/02; G02C 7/08; G02C 7/086; G02C 9/00; G06K 9/00255; G06K 9/00671
  See application file for complete search history.

(56) References Cited

U.S. PATENT DOCUMENTS

| | | | |
|---|---|---|---|
| 9,427,154 | B2 | 8/2016 | Eberl et al. |
| 9,594,247 | B2 | 3/2017 | Maimone et al. |
| 9,846,307 | B2 | 12/2017 | Tremblay et al. |
| 9,904,051 | B2 | 2/2018 | Aleem et al. |
| 9,989,764 | B2 | 6/2018 | Alexander et al. |
| 2010/0149073 | A1* | 6/2010 | Chaum ............... G02B 27/0172 345/8 |
| 2011/0157667 | A1 | 6/2011 | Lacoste et al. |
| 2013/0278631 | A1 | 10/2013 | Border et al. |
| 2015/0235463 | A1 | 8/2015 | Schowengerdt |
| 2016/0044276 | A1* | 2/2016 | Shearman ............ A42B 3/0426 348/207.1 |
| 2016/0089024 | A1 | 3/2016 | Katashiba |
| 2016/0238845 | A1 | 8/2016 | Alexander et al. |
| 2017/0202457 | A1 | 7/2017 | Swan et al. |
| 2017/0214907 | A1 | 7/2017 | Lapstun |
| 2017/0299870 | A1 | 10/2017 | Urey et al. |
| 2018/0107103 | A1 | 4/2018 | Holland et al. |
| 2018/0246336 | A1 | 8/2018 | Greenberg |

FOREIGN PATENT DOCUMENTS

| | | |
|---|---|---|
| WO | 2017059379 | 6/2017 |
| WO | 201857660 | 3/2018 |

OTHER PUBLICATIONS

U.S. Appl. No. 16/359,924, filed Mar. 20, 2019, Richard J. Topliss.

* cited by examiner

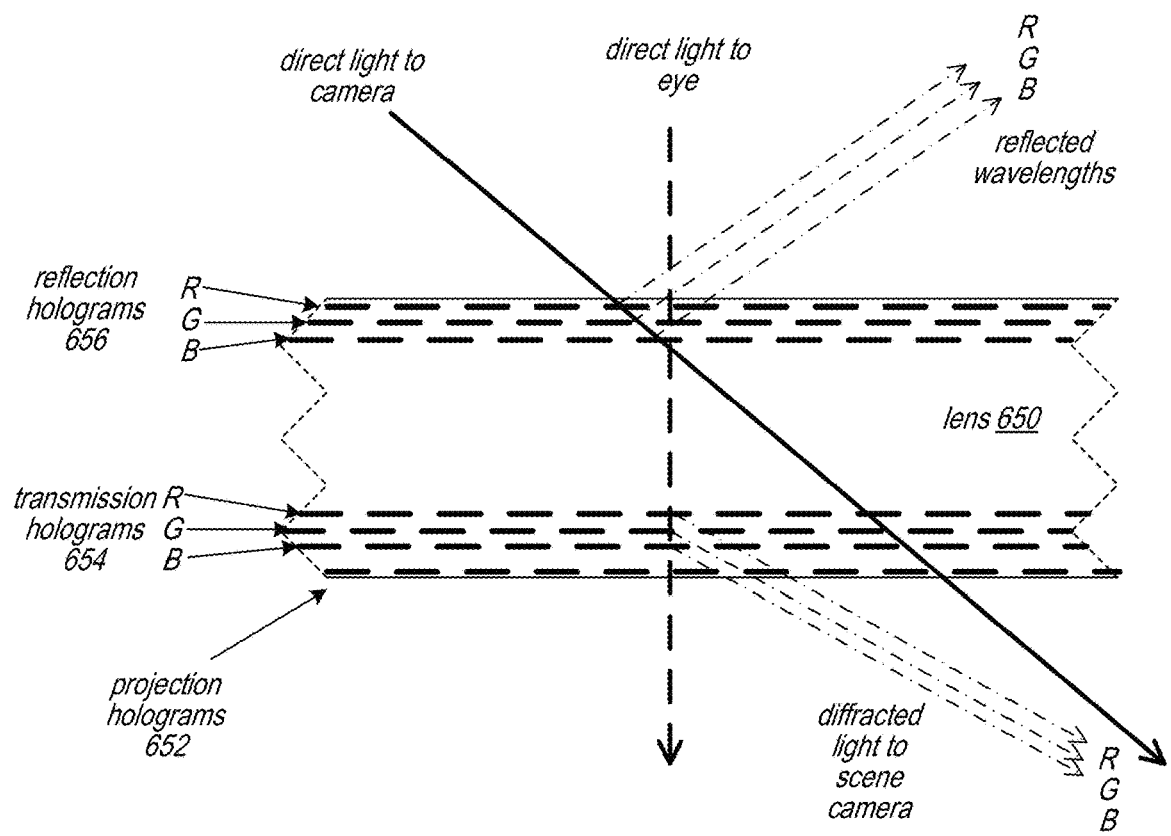
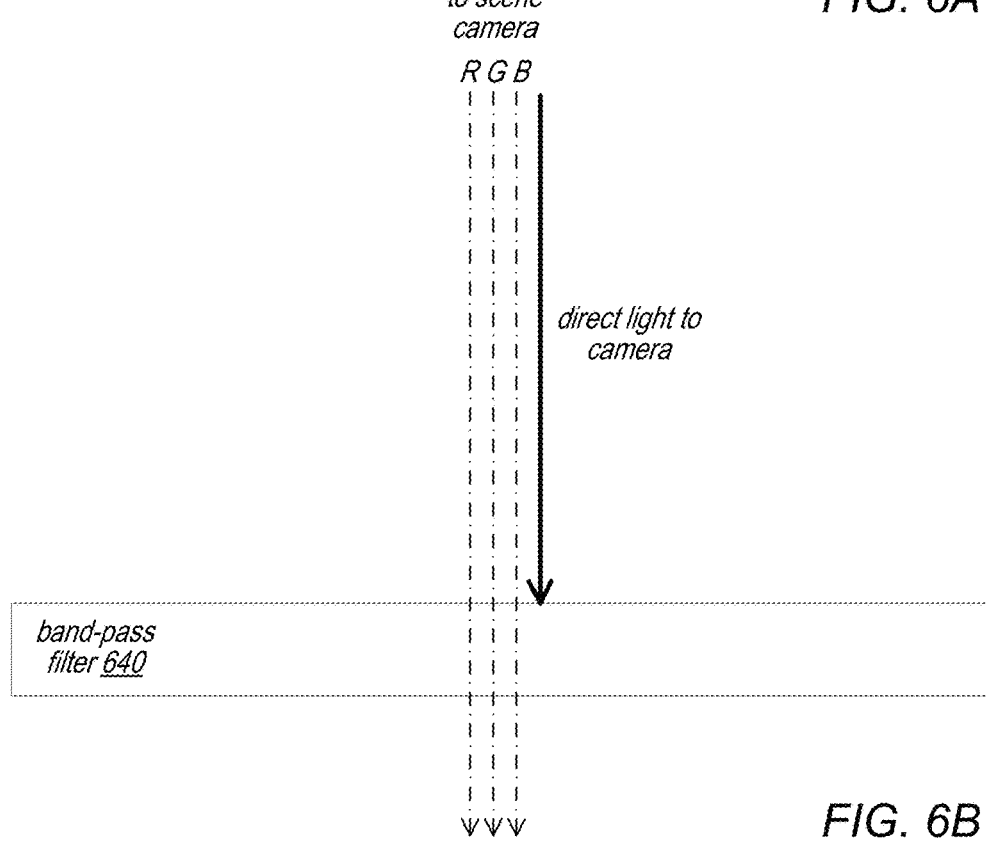
FIG. 6A
FIG. 6B

A portion of the direct light from a scene to the eye is diffracted to the scene camera by transmission holograms of the lens; unwanted direct light is blocked by reflection holograms on the lens and by a band-pass filter of the scene camera
3110

↓

The scene camera captures images of the scene and sends the images to a controller
3120

↓

The controller analyzes the images to locate objects and surfaces in the scene
3130

↓

The controller generates virtual content based at least in part on information about the scene determined from the images and sends the virtual content to the light engine
3140

↓

The light engine scans light beams to projection holograms of the lens
3150

↓

The projection holograms redirect the light beams to respective eye box points to form a mixed reality view that includes the virtual content placed appropriately in the user's view of the real environment
3160

FIG. 10

SCENE CAMERA

PRIORITY INFORMATION

This application claims benefit of priority of U.S. Provisional Application Ser. No. 62/715,128 entitled "SCENE CAMERA FOR MIXED REALITY SYSTEMS" filed Aug. 6, 2018, the content of which is incorporated by reference herein in its entirety.

BACKGROUND

Virtual reality (VR) allows users to experience and/or interact with an immersive artificial environment, such that the user feels as if they were physically in that environment. For example, virtual reality systems may display stereoscopic scenes to users in order to create an illusion of depth, and a computer may adjust the scene content in real-time to provide the illusion of the user moving within the scene. When the user views images through a virtual reality system, the user may thus feel as if they are moving within the scenes from a first-person point of view. Mixed reality (MR) covers a spectrum from augmented reality (AR) systems that combine computer generated information (referred to as virtual content) with views of the real world to augment, or add virtual content to, a user's view of their real environment (referred to as), to augmented vitality (AV) systems that combine representations of real world objects with views of a computer generated three-dimensional (3D) virtual world. The simulated environments of virtual reality systems and/or the mixed environments of mixed reality systems may thus be utilized to provide an interactive user experience for multiple applications, such as applications that add virtual content to a real-time view of the viewer's environment, applications that generate 3D virtual worlds, interacting with virtual training environments, gaming, remotely controlling drones or other mechanical systems, viewing digital media content, interacting with the Internet, exploring virtual landscapes or environments, or the like.

SUMMARY

Various embodiments of a scene camera for mixed reality (MR) direct retinal projector systems are described. Embodiments of an MR system are described that includes a scene camera that captures images of the real-world scene in front of the user. The images may, for example, be analyzed to locate edges and objects in the scene. In some embodiments, the images may also be analyzed to determine depth information for the scene. The information obtained from the analysis may, for example, be used to place virtual content in appropriate locations in the mixed view of reality provided by the direct retinal projector system. To achieve a more accurate representation of the perspective of the user, the scene camera is located on the side of the MR headset and facing the inside surface of the lens. The lens includes a holographic medium recorded with one or more transmission holograms that diffract a portion of the light from the scene that is directed to the user's eye to the scene camera. Thus, the scene camera captures images of the environment from substantially the same perspective as the user's eye.

To stop unwanted direct light from reaching the scene camera, a band-pass filter, tuned to the transmission hologram wavelength, may be used to block all direct view wavelengths other than the transmission hologram operating wavelength. In addition, a holographic medium may be applied to an outer surface of the lens and recorded with reflection holograms tuned to the same wavelength as the transmission holograms. The reflection holograms may reflect the light within that wavelength at direct view angles (i.e. direct light from the scene to the scene camera). The combination of the band-pass filter and reflection holograms thus block the unwanted direct light while still allowing the wavelength of light diffracted by the transmission holograms to reach the photosensor of the scene camera unhindered. The reflection holograms may also prevent the portion of the direct light to the scene camera corresponding to the wavelength of the transmission holograms from being diffracted to the user's eye by the transmission holograms.

BRIEF DESCRIPTION OF THE DRAWINGS

FIGS. 6A and 6B illustrate components of a scene camera for an MR system that captures multiple wavelengths, according to some embodiments.

FIG. 10 is high-level flowchart of a method of operation of an MR system as illustrated in FIGS. 7 and 8 that includes a scene camera as illustrated in FIGS. 2 through 6, according to some embodiments.

Figure 1:
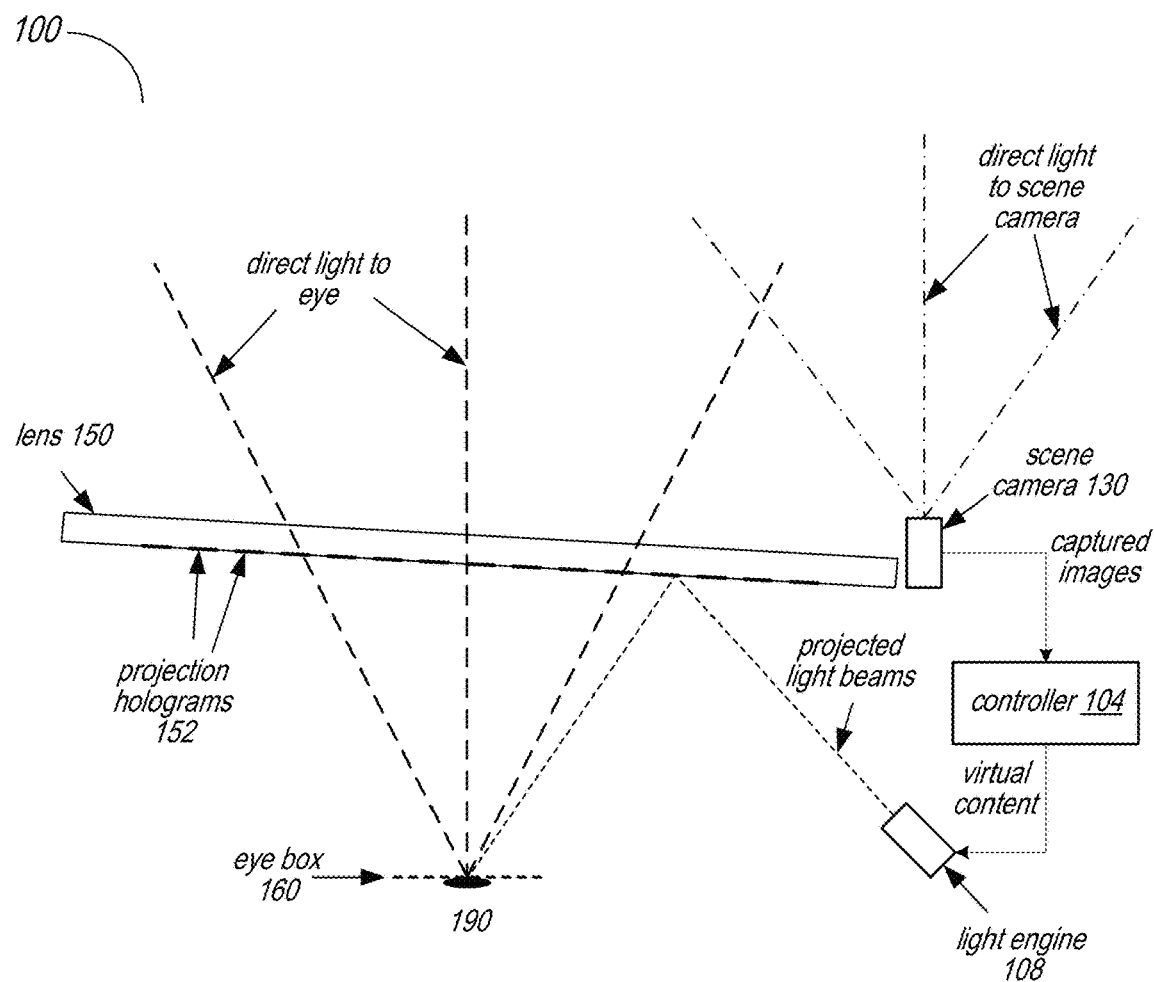
FIG. 1 illustrates a mixed reality (MR) system that includes a lens with projection holograms to redirect light beams from a light engine into a user's eye while also passing direct light from the environment to the user's eye.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of a scene camera for mixed reality (MR) direct retinal projector systems are described. Embodiments of an MR headset (e.g., a helmet, goggles, or glasses) are described that include a lens with a holographic medium recorded with a series of point to point projection holograms that direct light from a light engine into an eye box corresponding to the user's eye, while also transmitting light from the user's environment to thus provide an augmented or mixed view of reality. The MR headset also includes a scene camera that captures images of the real-world scene in front of the user. The images may, for example, be analyzed to locate edges and objects with respect to the user in the scene. In some embodiments, the images may also be analyzed to determine depth information for the scene. The information obtained from the analysis may, for example, be used to place virtual content in appropriate locations in the mixed view of reality provided by the direct retinal projector system. To correctly place the virtual content in the mixed view of reality, the images captured by the scene camera should provide an accurate representation of the perspective of the user. However, this is difficult to achieve by locating the scene camera on the MR headset to directly capture images of the scene in front of the user, as the scene camera would have a different perspective of the scene than the user's eye. In embodiments, to achieve a more accurate representation of the perspective of the user, the scene camera is instead located on the side of the MR headset and facing the inside surface of the lens, and the lens further includes a holographic medium recorded with one or more transmission holograms that diffract a portion of the light from the scene that is directed to the user's eye to the scene camera. Thus, the scene camera captures images of the environment from substantially the same perspective as the user's eye.

In some embodiments, the transmission holograms may be recorded to diffract a range of wavelengths, for example a range from the green (495-570 nm) portion of the visible light spectrum, to the scene camera. However, the transmission holograms may allow direct light from the scene to reach the scene camera for all wavelengths of visible light. To stop this unwanted direct light, in some embodiments, a band-pass filter, tuned to the transmission hologram wavelength, is used to block all direct view wavelengths other than the transmission hologram operating wavelength. In addition, a holographic medium (e.g., a holographic film) may be applied to an outer surface of the lens, within which is recorded reflection holograms tuned to the same wavelength as the transmission holograms. The reflection holograms may be constructed to reflect the light within that wavelength at direct view angles. The combination of the band-pass filter and reflection holograms thus block the unwanted direct view while still allowing the desired image of the scene to reach the photosensor of the scene camera unhindered.

The transmission holograms diffract light from the conjugate of one construction point (the scene camera) to the other construction point (the user's eye). Therefore, light in the target wavelength (e.g., green light) incident from the direct view may be diffracted directly into the user's eye, causing an unwanted ghost image of the scene. The reflection holograms may also prevent the portion of the direct light to the scene camera corresponding to the target wavelength from being diffracted to the user's eye by the transmission holograms, as the target wavelength incident from the direct view is blocked by the reflection holograms before reaching the transmission holograms.

Direct Retinal Projector MR System

FIG. 1 illustrates a mixed reality (MR) system 100, according to some embodiments. An MR system 100 may include, but is not limited to, a lens 150 with projection holograms 152, a light engine 108, a controller 104, and a scene camera 130. Note that for simplicity FIG. 1 shows the MR system 100 for one eye; in practice, there may be a lens 150 with projection holograms 152, a light engine 108, and a scene camera 130 for each eye.

Figure 7:
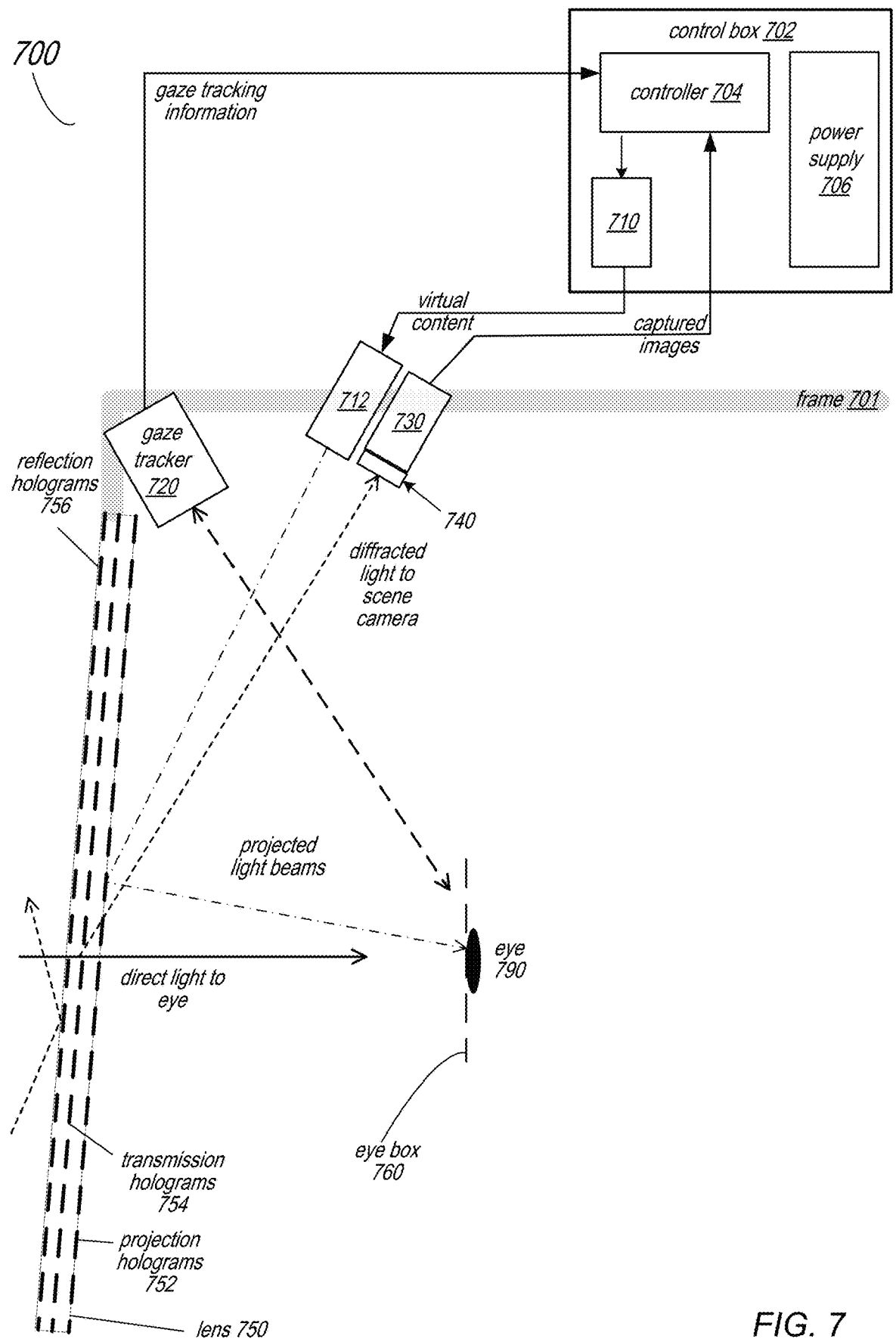
FIG. 7 illustrates an example MR system that includes a headset with a light engine, a scene camera and a separate control box, according to some embodiments.
Figure 8:
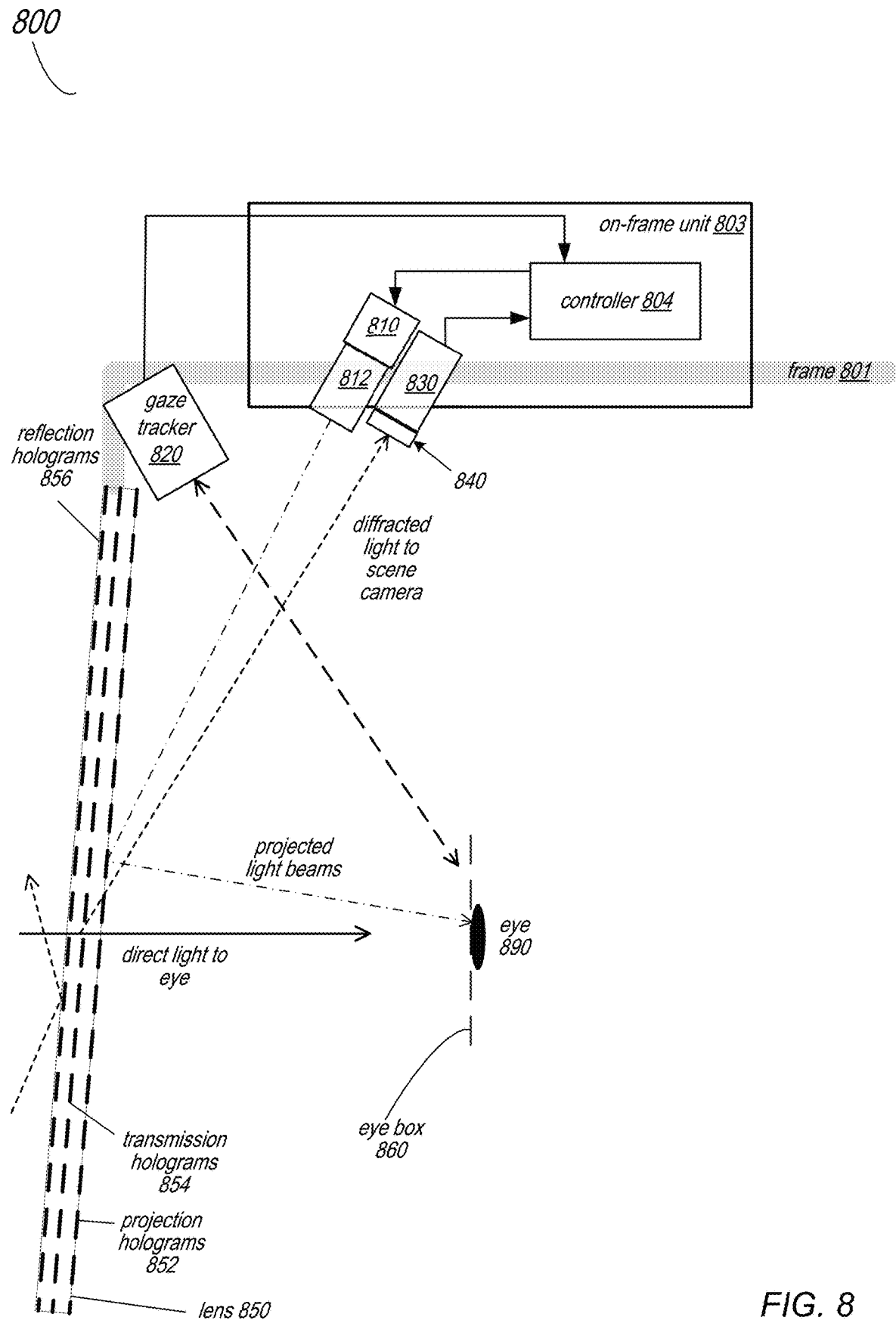
FIG. 8 illustrates an example MR system in which the light engine and scene camera are contained in an on-frame unit.

In some embodiments, the light engine 108 may include multiple light sources (e.g., laser diodes, LEDs, etc.) coupled to projectors that independently project light to the projection holograms 152 from different projection points. In some embodiments, there may be three light sources coupled to three projectors for each eye; however, more or fewer light sources and projectors may be used in some embodiments. Each light source may be an RGB light source (e.g., an RGB laser). In some embodiments, as shown in FIG. 7, the projectors may be components of or mounted on the MR headset, and the light sources may be contained in a control box separate from the MR headset that may, for example, be carried on a user's hip, in a backpack, or otherwise carried or worn separately from the headset worn by the user. The control box may also contain a controller 104 and power supply (not shown) for the MR system 100. The light sources may be coupled to the projectors via fiber optic cables, with each light source coupled to one of the projectors. Alternatively, in some embodiments, the controller 104, light sources, and the projectors may be contained in a unit that is a component of or mounted on the MR headset, as shown in FIG. 8.

In some embodiments, an MR headset may include reflective holograms (referred to as projection holograms 152) that direct light from multiple (e.g., three) projectors of a light engine 108 into an eye box 160 corresponding to the user's eye 190, while also transmitting light from the user's environment to thus provide an augmented or mixed view of reality. The projection holograms 152 may, for example, be implemented as a holographic film on a relatively flat lens 150, which may allow the MR headset to be implemented as a relatively normal-looking pair of glasses. The holographic film may be recorded with a series of point to point holograms projection holograms 152. In some embodiments, each projector interacts with multiple holograms 152 to project light onto multiple locations (referred to as eye box points) in the eye box 160. The holograms 152 may be arranged so that neighboring eye box points are illuminated by different projectors. In some embodiments, only one projector is active at a given time; when activated, a projector projects light from a corresponding light source (e.g., an RGB laser) to all of its eye box points. However, in some embodiments, more than one projector, or all of the projectors, may be active at the same time.

While not shown in FIG. 1, in some embodiments, the MR headset may include a gaze tracking component implemented according to any of a variety of gaze tracking technologies that may, for example, provide gaze tracking input to the controller 104 so that the light beams projected by the light engine 108 can be adjusted according to the current position of the user's eye 190. For example, different ones of the light sources and projectors may be activated to project light onto different eye box points based on the current position of the user's eye 190.

The MR system 100 may add information and graphics (referred to as virtual content) to a real-world scene being viewed through the lens 150 by the user. Embodiments of an MR system 100 may also include a scene camera 130 that captures images of the real-world scene in front of the user. The captured images may, for example, be analyzed by controller 104 to locate edges and objects in the scene. In some embodiments, the images may also be analyzed to determine depth information for the scene. The information obtained from the analysis may, for example, be used by the controller 104 to place the virtual content in appropriate locations in the mixed view of reality provided by the MR system 100. As shown in FIG. 1, a scene camera 130 could be located on the MR headset to directly capture images of the scene in front of the user. However, to correctly place the virtual content in the mixed view of reality, the images captured by the scene camera 130 should provide an accurate representation of the perspective of the user. However, this is difficult to achieve by locating the scene camera 130 on the MR headset to directly capture images of the scene in front of the user as shown in FIG. 1, as the scene camera 130 would have a different perspective of the scene than the user's eye 190, as can be seen in FIG. 1.

Direct Retinal Projector MR System with Scene Camera

Embodiments of an MR system with a scene camera are described. Point to point holograms can be leveraged to provide a scene camera for an augmented reality glasses display system. A glass or plastic substrate acts as spectacle style lens. A holographic medium (e.g., a holographic film) is applied to a surface of the lens, within which is recorded a series of point to point transmission holograms. The construction points of the holograms are arranged at the eye and at the pupil of a camera placed to the temple side of the user's eye. The recorded transmission holograms act by diffracting a portion of the light from the scene surrounding the user that is heading for the user's eye towards the scene camera. The hologram efficiency is balanced so that the user is still able to see the surrounding scene. Advantages of the scene camera include:

The scene camera can be housed in the same light engine assembly as the projectors, minimizing space particularly around the glasses frames.

The perspective of the view seen by the scene camera is substantially identical to that seen by the user. This is an important advantage since it is very challenging to determine the perspective seen by the user by other means. However, such a perspective is necessary to accurately overlay projected AR objects.

In some embodiments, the transmission holograms may be recorded to diffract a range of wavelengths from the green (495-570 nm) portion of the visible light spectrum to the scene camera. As a non-limiting example, the transmission holograms may be recorded to diffract light within a range of 510-530 nm to the scene camera. However, the transmission holograms may be recorded to diffract light within other portions or ranges of the visible light spectrum to the scene camera. Further, in some embodiments, two or more layers of transmission holograms may be recorded to diffract two or more different ranges of the visible light spectrum to the scene camera. For example, in some embodiments, three layers of transmission holograms may be recorded to respectively diffract ranges from within the red, green, and blue portions of the visible light spectrum to the scene camera. Note that, for some applications, the transmission holograms may be recorded to diffract light within a range that is outside the visible light spectrum, for example a range within the infrared portion of the electromagnetic spectrum, to a camera.

As previously noted, in some embodiments, the transmission holograms may be recorded to diffract a range of wavelengths, for example a range from the green (495-570 nm) portion of the visible light spectrum, to the scene camera. However, the transmission holograms may allow direct light from the scene to reach the scene camera for all wavelengths of visible light. This signal is far brighter than the diffracted portion of the visible light spectrum that is received at the scene camera, and swamps the desired green transmission hologram image captured by the scene camera. To work properly, the system should stop this unwanted direct light from reaching the scene camera and swamping the desired holographic view of the scene. To stop this unwanted direct light, in some embodiments, a band-pass filter, tuned to the transmission hologram wavelength, is used to block all direct view wavelengths other than the transmission hologram operating wavelength. In addition, a holographic medium (e.g., a holographic film) may be applied to an outer surface of the lens, within which is recorded reflection holograms tuned to the same wavelength as the transmission holograms. The reflection holograms may be constructed to reflect the light within that wavelength at direct view angles. The combination of the band-pass filter and reflection holograms thus block the unwanted direct view while still allowing the desired image of the scene to reach the photosensor of the scene camera unhindered.

Figure 2:
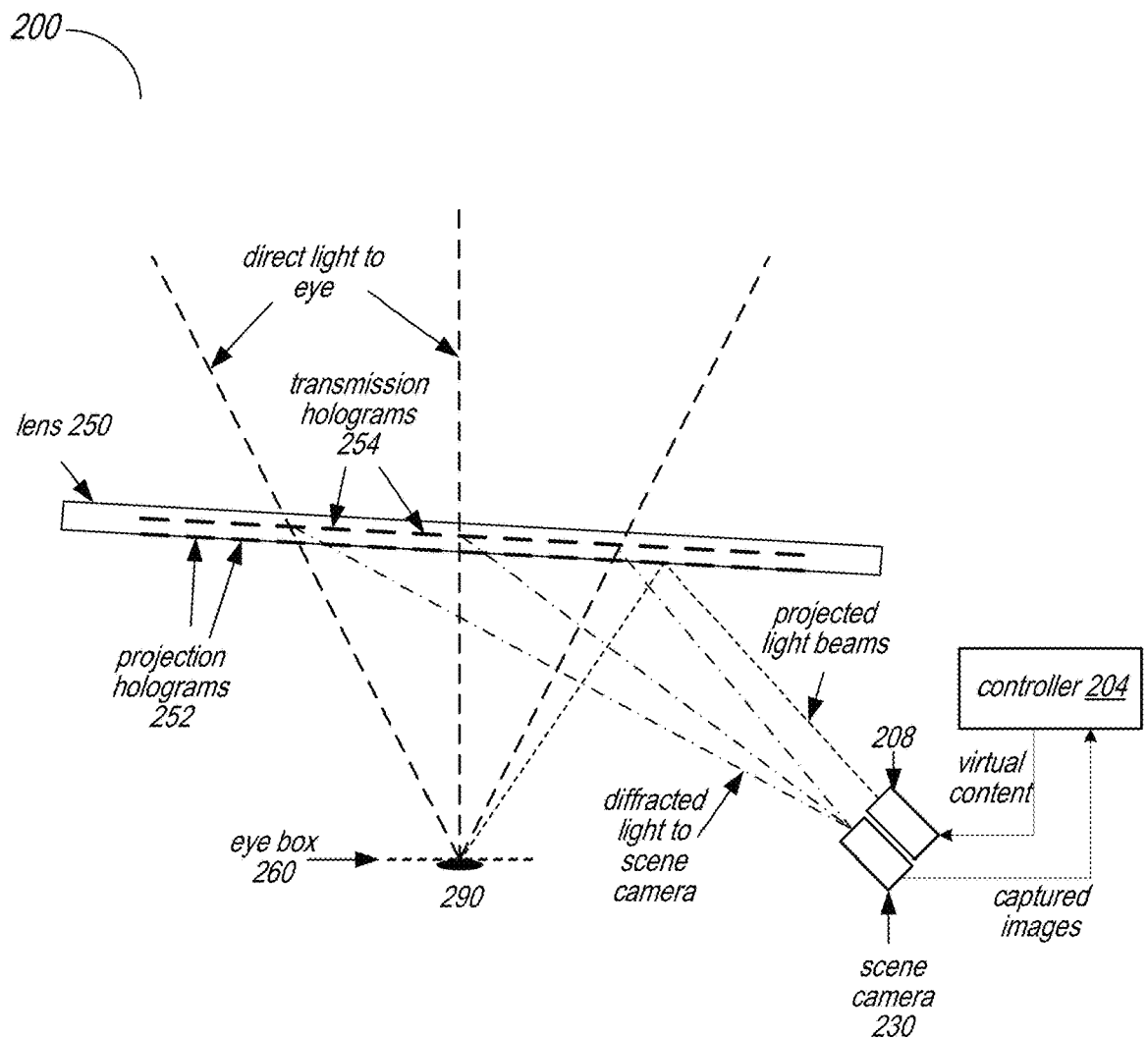
FIG. 2 illustrates a MR system in which the lens also includes transmission holograms to diffract a portion of the direct light to the user's eye to a scene camera while passing the remainder of the direct light to the user's eye, according to some embodiments.

FIG. 2 illustrates an MR system 200 in which the lens also includes transmission holograms to diffract a portion of the direct light to the user's eye to a scene camera while passing the remainder of the direct light to the user's eye, according to some embodiments. An MR system 200 may include, but is not limited to, a lens 250 with projection holograms 252, a light engine 208, a controller 204, and a scene camera 230. In these embodiments, to achieve a more accurate representation of the perspective of the user, instead of locating the scene camera 130 on the MR headset to capture a direct view of the scene as shown in FIG. 1, the scene camera 230 is located on the side of the MR headset (at the temple side of the user's eye) and facing the inside surface of the lens 250. In addition to the projection holograms 252, the lens 250 is recorded with one or more point to point transmission holograms 254 that diffract a portion of the light from the scene (e.g., s range of wavelengths from the green portion of the visible light spectrum) that is directed to the user's eye 290 to the scene camera 230. Thus, the scene camera 230 captures images of the environment from substantially the same perspective as the user's eye 290. The captured images may, for example, be analyzed by controller 204 to locate edges and objects in the scene. In some embodiments, the images may also be analyzed to determine depth information for the scene. The information obtained from the analysis may, for example, be used by the controller 204 to place the virtual content in appropriate locations in the mixed view of reality provided by the MR system 200.

Figure 3A:
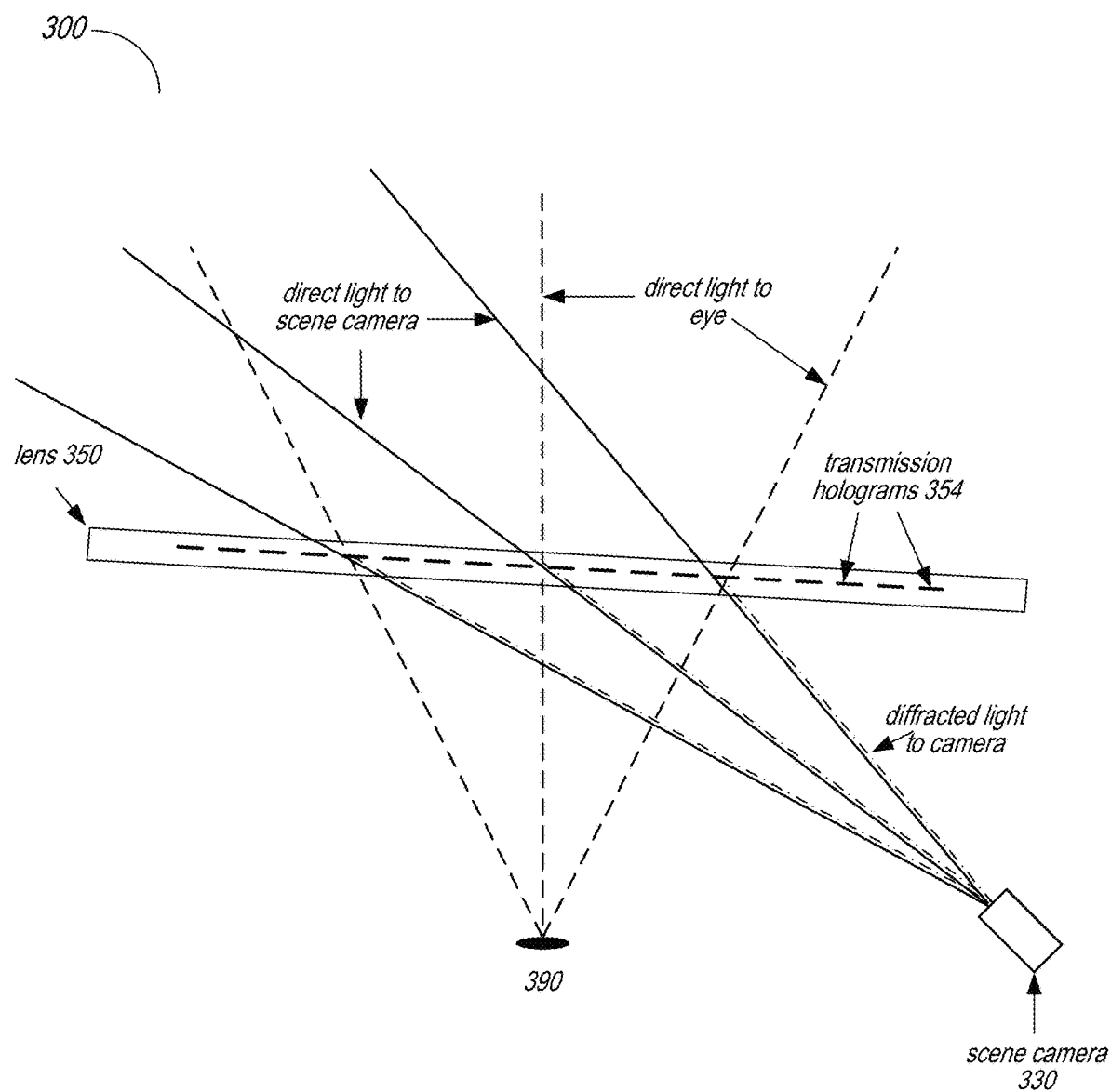
FIG. 3A shows that, in addition to the diffracted light, direct light from the environment may also be received at the scene camera.

FIGS. 3A through 3E illustrate methods for preventing unwanted light from reaching the scene camera and the user's eye, according to some embodiments. As shown in FIG. 3A, an MR system 300 may include, but is not limited to, a lens 350 with projection holograms (not shown) and transmission holograms 354, a light engine and controller (not shown), and a scene camera 330. FIG. 3A shows that, in addition to the diffracted light wavelength, direct light from the environment in all wavelengths may also be received at the scene camera 330. The transmission holograms 354 may be recorded to diffract a range of wavelengths, for example a range from the green (495-570 nm) portion of the visible light spectrum, to the scene camera 330. However, as shown in FIG. 3A, the transmission holograms 354 may allow direct light from the scene to the scene camera 330 to reach the scene camera 330 for all wavelengths of visible light. This unwanted light would overpower the diffracted light from the transmission holograms 354.

Figure 3B:
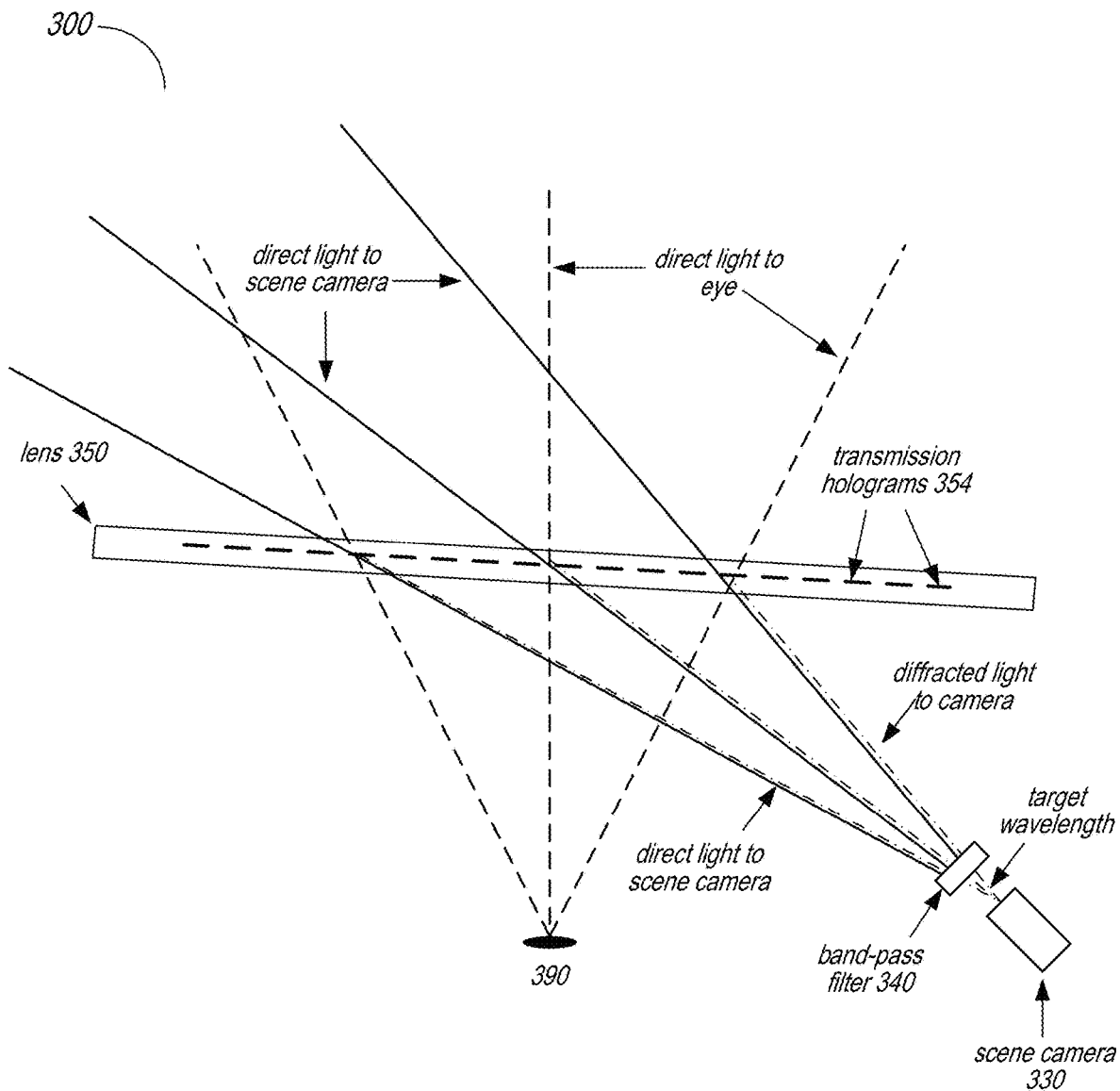
FIG. 3B illustrates a band-pass filter located in front of the scene camera that prevents a portion of the direct light from reaching the scene camera, according to some embodiments.

FIG. 3B illustrates a band-pass filter 340 located at or in front of the scene camera 330 that prevents a portion of the direct light from reaching the scene camera 330, according to some embodiments. The band-pass filter 340 may be tuned to block all wavelengths other than the transmission hologram operating wavelength (referred to as the target wavelength), thus allowing only the target wavelength to reach the camera 330 photosensor. However, since the band-pass filter 340 does not block the target wavelength, in addition to the light in the target wavelength that is diffracted to the scene camera 330 by the transmission holograms 354, the band-pass filter 340 would also allow light in the target wavelength from the direct view of the scene to reach the camera 330 photosensor.

Figure 3C:
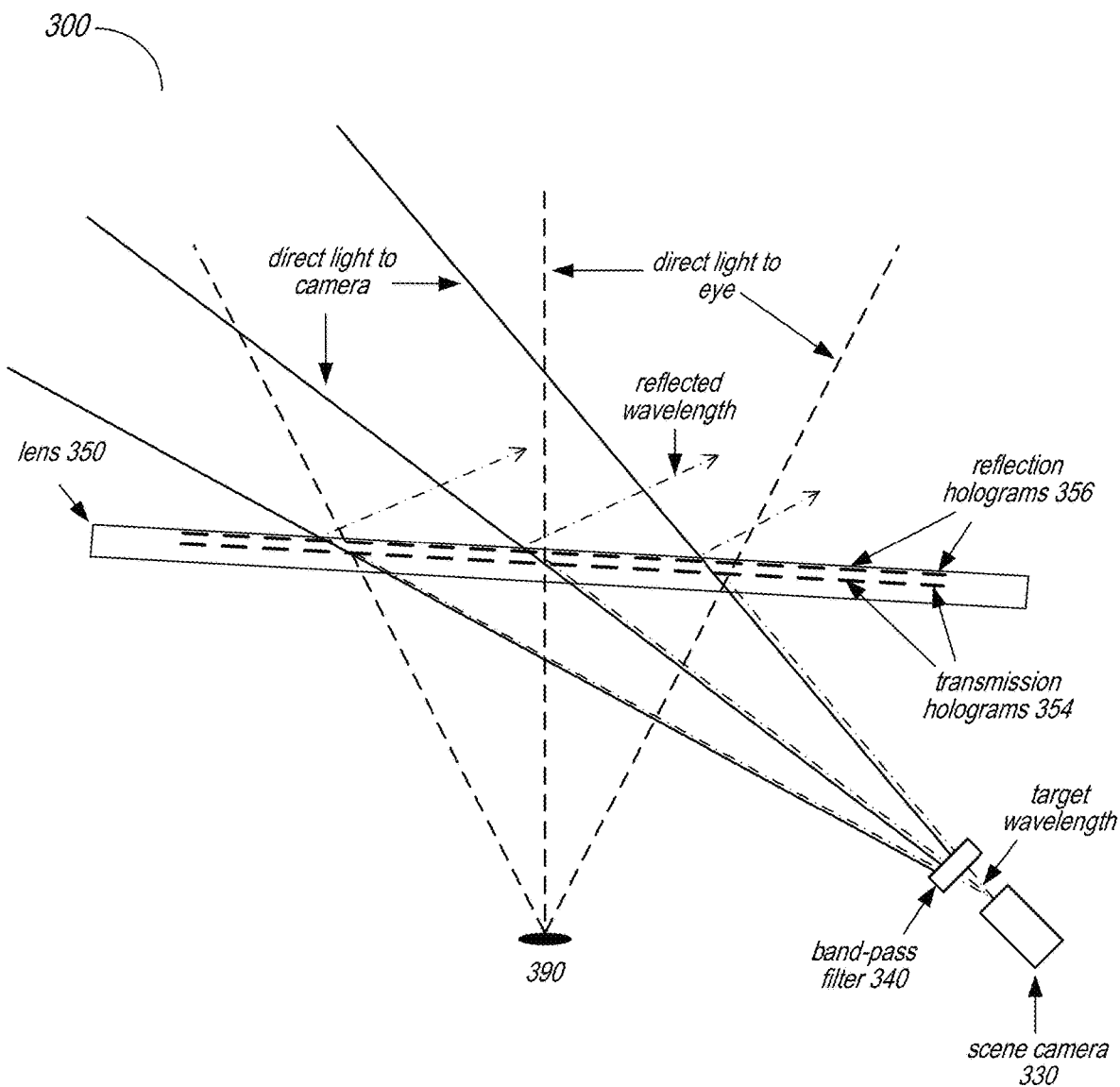
FIG. 3C illustrates reflection holograms at the lens that prevent the portion of the direct light corresponding to the wavelength of the diffracted light from reaching the scene camera, according to some embodiments.

FIG. 3C illustrates reflection holograms at the lens that prevent the portion of the direct light corresponding to the wavelength of the diffracted light from reaching the scene camera, according to some embodiments. As noted above, in addition to the light in the target wavelength that is diffracted to the scene camera 330 by the transmission holograms 354, the band-pass filter 340 would also allow light in the target wavelength from the direct view of the scene to reach the camera 330 photosensor. This unwanted light may overpower the diffracted light, and since the light is received from a different angle, would form a "ghost" image at the camera 330 photosensor. To block this unwanted light, in addition to including the band-pass filter 340 at the scene camera 330, a holographic medium (e.g., a holographic film) may be applied to an outer surface of the lens 340, within which is recorded reflection holograms 356 tuned to the same wavelength as the transmission holograms 354. The reflection holograms 356 are constructed to reflect the light within the target wavelength at direct view angles.

The combination of the band-pass filter 340 and reflection holograms 356 thus block substantially all of the unwanted direct light from reaching the scene camera 330 while still allowing the target wavelength of light diffracted by the transmission holograms 354 to reach the photosensor of the scene camera 330 unhindered to form a clean image of the scene in the target wavelength that can be captured and processed.

Figure 3D:
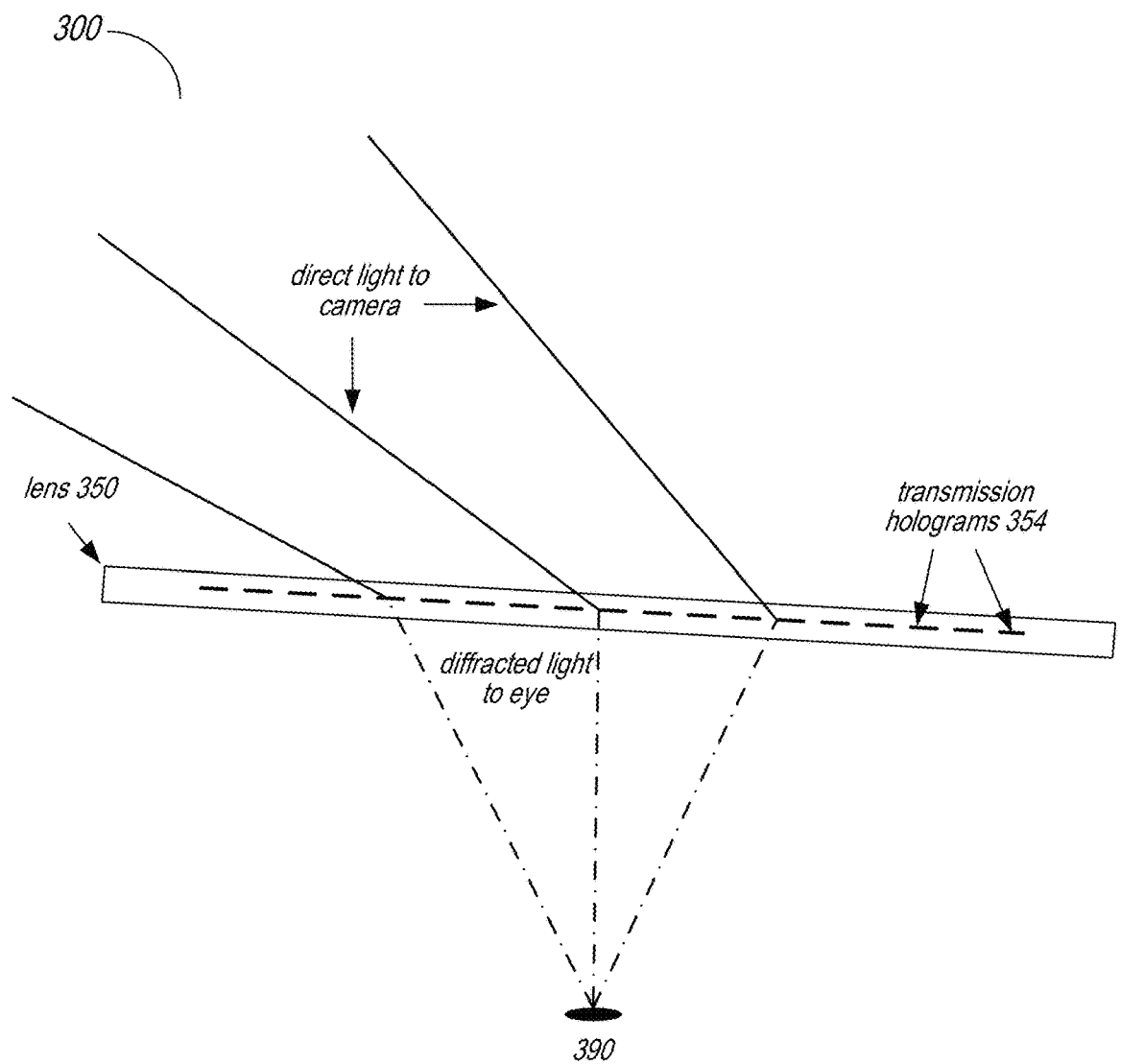
FIGS. 3D and 3E illustrate that the reflection holograms at the lens also prevent a portion of the direct light to the scene camera corresponding to the target wavelength from being diffracted to the user's eye.
Figure 3E:
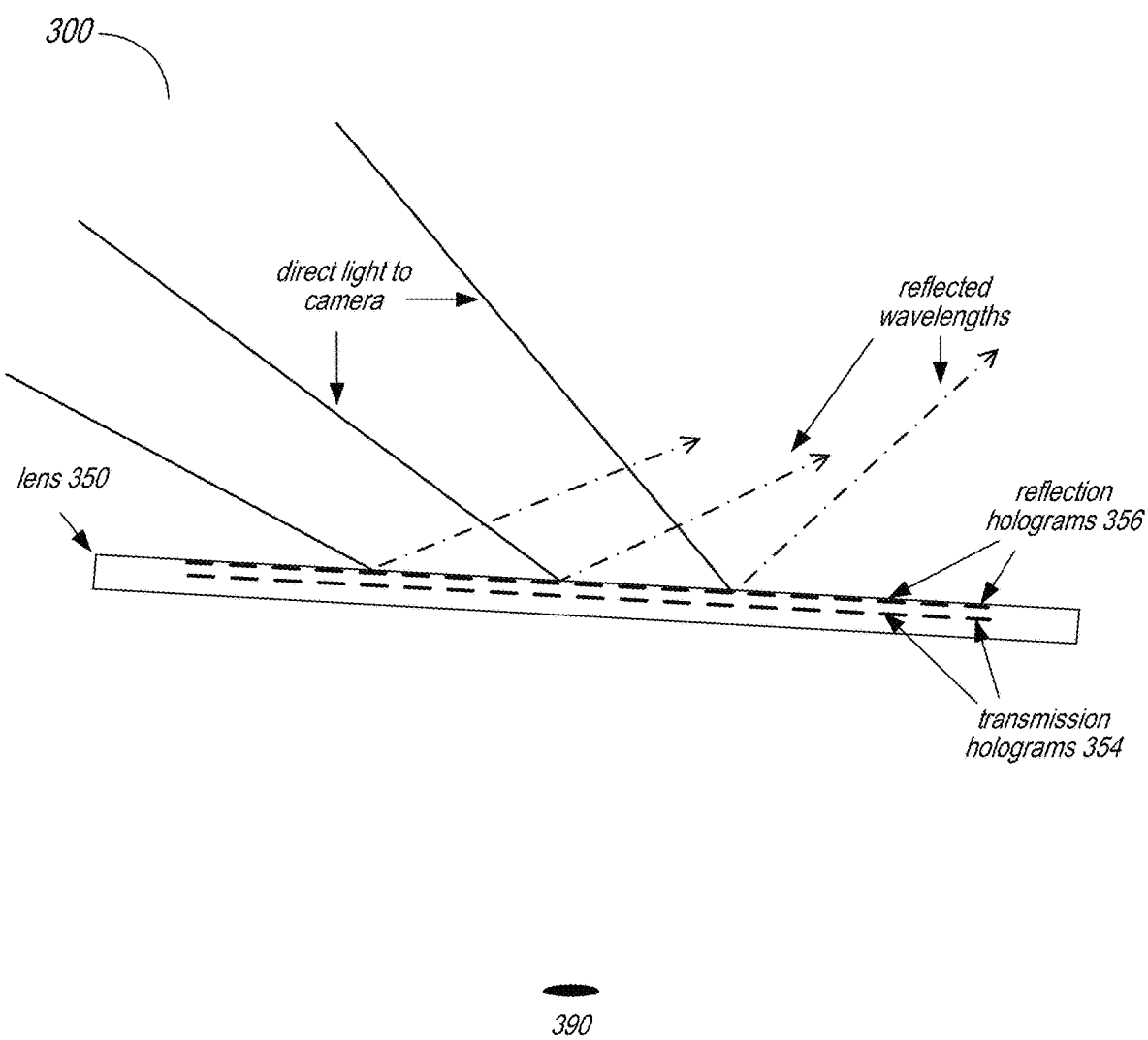

FIGS. 3D and 3E illustrate that the reflection holograms 356 at outer surface of the lens 350 also prevent a portion of the direct light to the scene camera 330 corresponding to the target wavelength from being diffracted to the user's eye 390. As shown in FIG. 3D, the transmission holograms 354 diffract light from the conjugate of one construction point (camera 330) to the other construction point (eye 390). Therefore, light in the target wavelength (e.g., green light) incident from the direct view may be diffracted directly into the user's eye 390, causing an unwanted ghost image of the scene. FIG. 3E shows that the reflection holograms 354 described in reference to FIG. 3C also prevent the portion of the direct light to the scene camera corresponding to the target wavelength from being diffracted to the user's eye by the transmission holograms 354, as the target wavelength incident from the direct view is reflected by holograms 356 before reaching transmission holograms 354.

Figure 4:
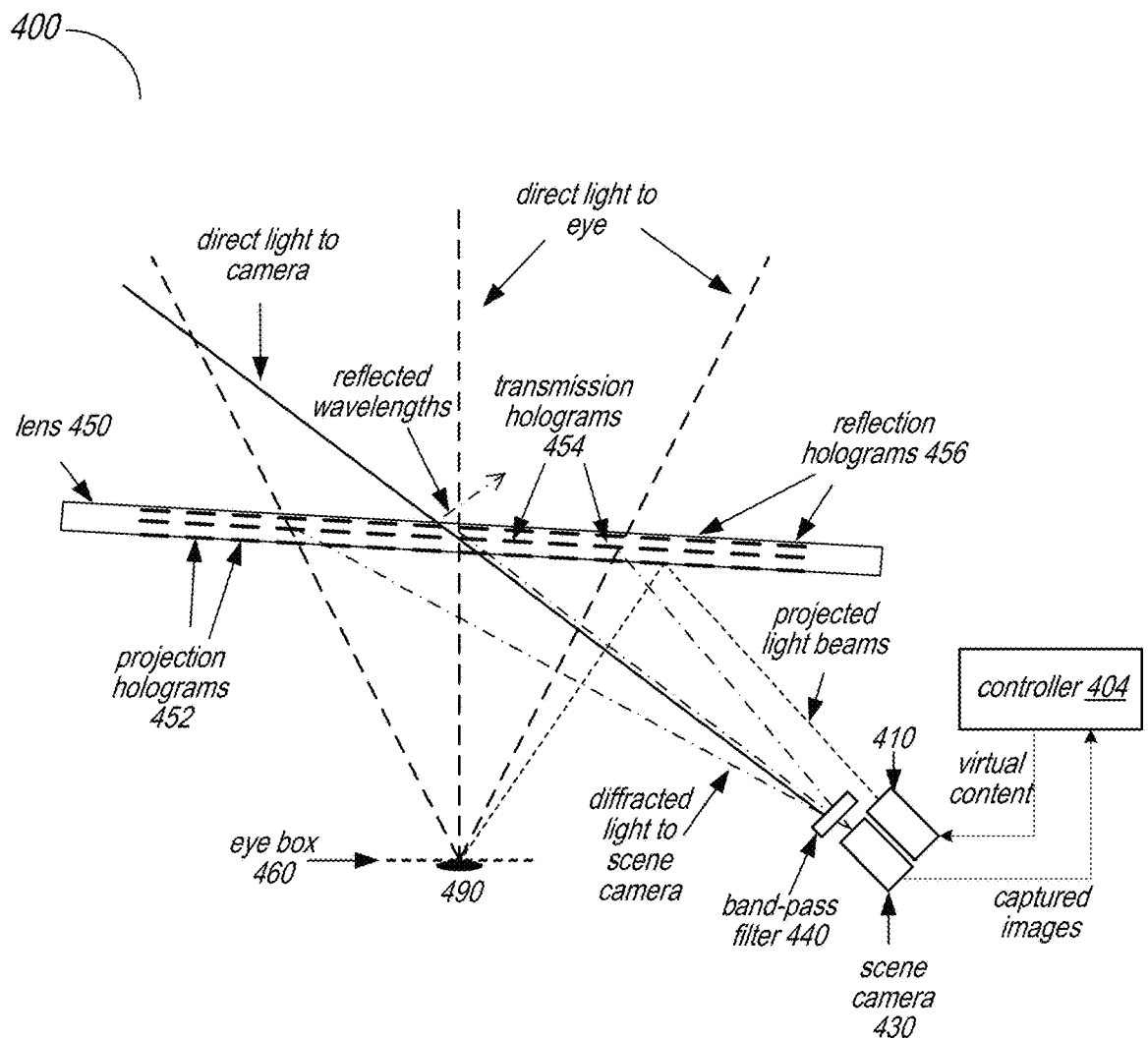
FIG. 4 illustrates a MR system in which the lens includes reflection holograms, transmission holograms, and projection holograms, a scene camera, and a band-pass filter in front of the scene camera, according to some embodiments.

FIG. 4 illustrates a MR system 400, according to some embodiments. MR system 400 may include, but is not limited to, a lens 450 that includes holographic media recorded with reflection holograms 456, transmission holograms 454, and projection holograms 452, a light engine 410, a controller 404, a scene camera 430, and a band-pass filter 440 at or in front of the scene camera 430. Note that for simplicity FIG. 4 shows the MR system 400 for one eye 490; in practice, there may be a lens 450 with holograms 456, 454 and 452, a light engine 410, and a scene camera 430 with band-pass filter 440 for each eye.

In some embodiments, the light engine 410 may include multiple light sources (e.g., laser diodes, LEDs, etc.) coupled to projectors that independently project light to the projection holograms 452 from different projection points. In some embodiments, there may be three light sources coupled to three projectors for each eye; however, more or fewer light sources and projectors may be used in some embodiments. Each light source may be an RGB light source (e.g., an RGB laser). In some embodiments, as shown in FIG. 7, the projectors may be components of or mounted on the MR headset, and the light sources may be contained in a control box separate from the MR headset that may, for example, be carried on a user's hip, in a backpack, or otherwise carried or worn separately from the headset worn by the user. The control box may also contain a controller 404 and power supply (not shown) for the MR system 400. The light sources may be coupled to the projectors via fiber optic cables, with each light source coupled to one of the projectors. Alternatively, in some embodiments, the controller 404, light sources, and the projectors may be contained in a unit that is a component of or mounted on the MR headset, as shown in FIG. 8.

In some embodiments, an MR headset may include reflective holograms (referred to as projection holograms 452) that direct light from multiple (e.g., three) projectors of a light engine 410 into an eye box 460 corresponding to the user's eye 490, while also transmitting light from the user's environment to thus provide an augmented or mixed view of reality. The projection holograms 452 may, for example, be implemented as a holographic film on a relatively flat lens 450, which may allow the MR headset to be implemented as a relatively normal-looking pair of glasses. The holographic film may be recorded with a series of point to point holograms projection holograms 452. In some embodiments, each projector interacts with multiple holograms 452 to project light onto multiple locations (referred to as eye box points) in the eye box 460. The holograms 452 may be arranged so that neighboring eye box points are illuminated by different projectors. In some embodiments, only one projector is active at a given time; when activated, a projector projects light from a corresponding light source (e.g., an RGB laser) to all of its eye box points. However, in some embodiments, more than one projector, or all of the projectors, may be active at the same time.

While not shown in FIG. 4, in some embodiments, the MR headset may include a gaze tracking component implemented according to any of a variety of gaze tracking technologies that may, for example, provide gaze tracking input to the controller 404 so that the light beams projected by the light engine 410 can be adjusted according to the current position of the user's eye 490. For example, different ones of the light sources and projectors may be activated to project light onto different eye box points based on the current position of the user's eye 490.

The MR system 400 may add information and graphics (referred to as virtual content) to a real-world scene being viewed through the lens 450 by the user. Embodiments of an MR system 400 may also include a scene camera 430 that captures images of the real-world scene in front of the user. To achieve a more accurate representation of the perspective of the user, instead of locating the scene camera on the MR headset to capture a direct view of the scene as shown in FIG. 1, the scene camera 430 is located on the side of the MR headset (at the temple side of the user's eye) and facing the inside surface of the lens 450. In addition to the projection holograms 452, the lens 450 is recorded with one or more point to point transmission holograms 454 that diffract a portion of the light from the scene (e.g., s range of wavelengths from the green portion of the visible light spectrum) that is directed to the user's eye 490 to the scene camera 430. Thus, the scene camera 430 captures images of the environment from substantially the same perspective as the user's eye 490. The captured images may, for example, be analyzed by controller 404 to locate edges and objects in the scene. In some embodiments, the images may also be analyzed to determine depth information for the scene. The information obtained from the analysis may, for example, be used by the controller 404 to place the virtual content in appropriate locations in the mixed view of reality provided by the MR system 400.

The transmission holograms 454 may be recorded to diffract a range of wavelengths, for example a range from the green (495-570 nm) portion of the visible light spectrum, to the scene camera 430. However, as shown in FIG. 3A, the transmission holograms may allow direct light from the scene to reach the scene camera for all wavelengths of visible light. This unwanted light would overpower the diffracted light from the transmission holograms 454. To stop this unwanted direct light, a band-pass filter 440, tuned to the transmission hologram 454 wavelength, is used to block all direct view wavelengths other than the transmission hologram 454 operating wavelength. In addition, a holographic medium (e.g., a holographic film) may be applied to an outer surface of the lens 450, within which is recorded reflection holograms 456 tuned to the same wavelength as the transmission holograms 454. The reflection holograms 456 may be constructed to reflect the light within that wavelength at direct view angles. The combination of the band-pass filter 440 and reflection holograms 456 thus block the unwanted direct view while still allowing the desired image of the scene to reach the photosensor of the scene camera 430 unhindered.

As shown in FIG. 3D, light in the target wavelength (e.g., green light) incident from the direct view may be diffracted directly into the user's eye 490, causing an unwanted ghost image of the scene. The reflection holograms 454 also prevent the portion of the direct light to the scene camera 430 corresponding to the target wavelength from being diffracted to the user's eye 490 by the transmission holograms 454, as the target wavelength incident from the direct view is reflected by holograms 456 before reaching transmission holograms 454.

Figure 5A:
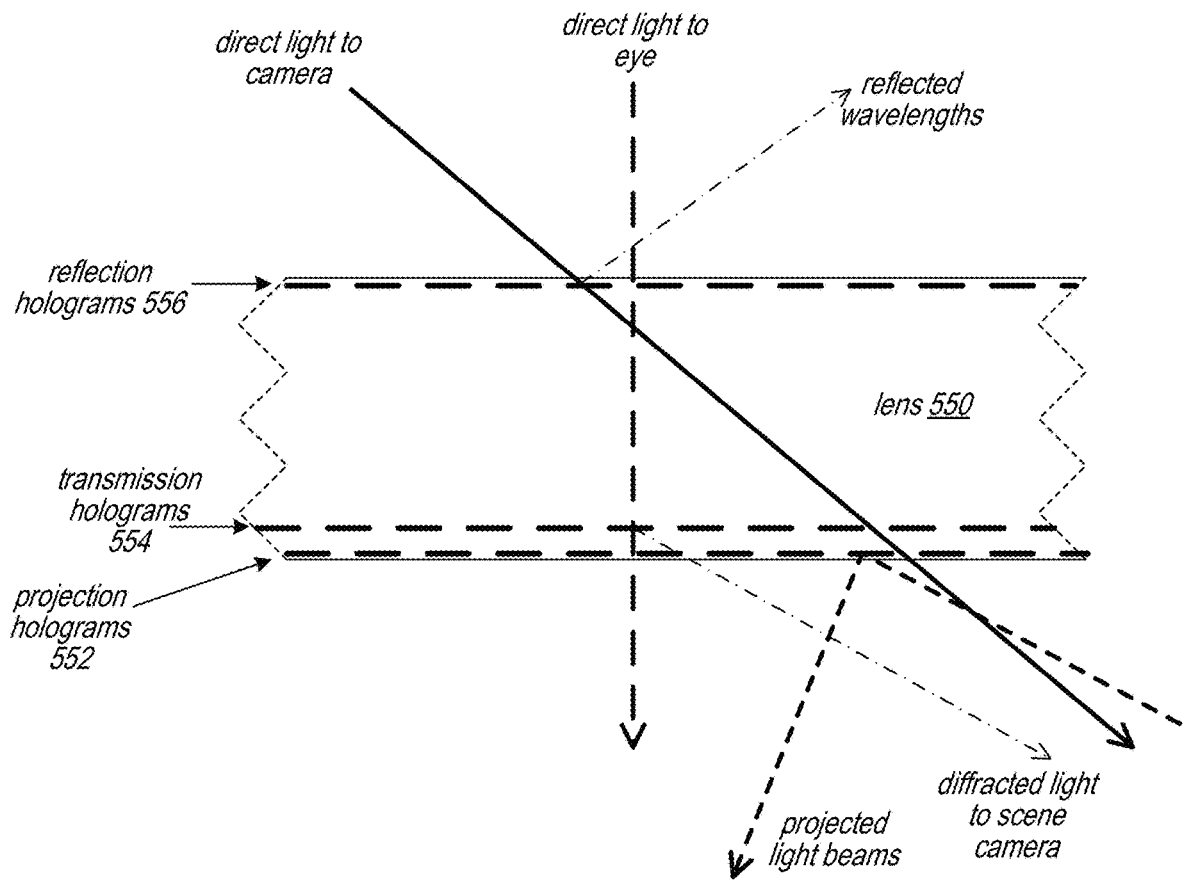
FIGS. 5A and 5B illustrate components of a scene camera for an MR system that captures a single wavelength, according to some embodiments.
Figure 5B:
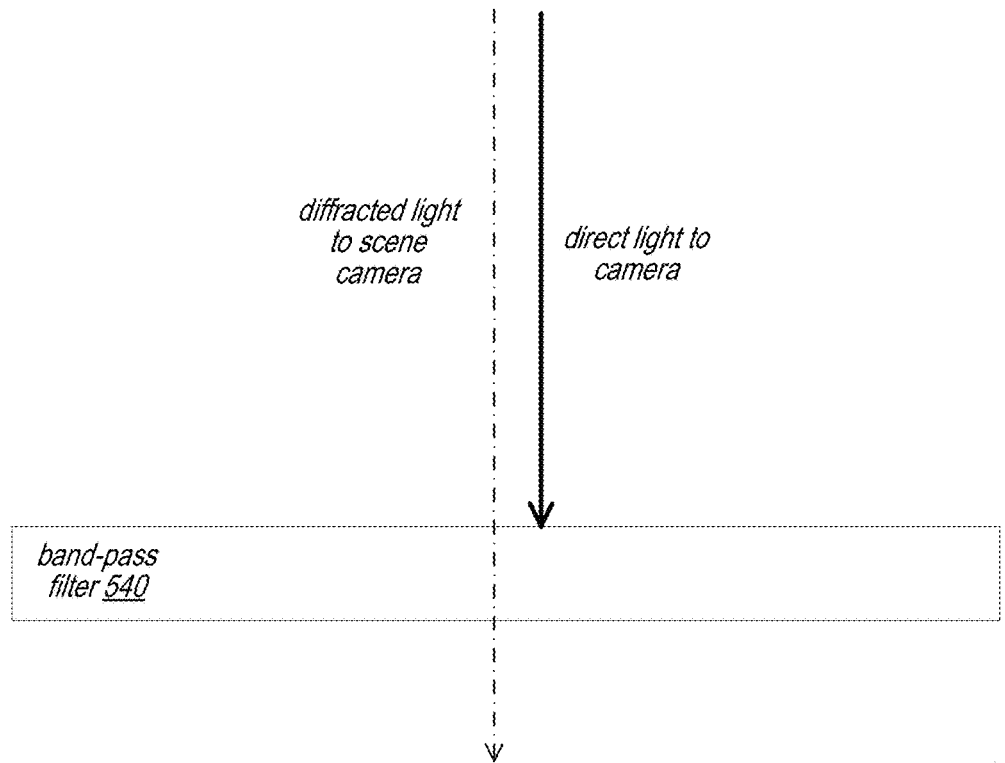

FIGS. 5A and 5B illustrate components of a scene camera for an MR system that captures a single wavelength, according to some embodiments. FIG. 5A illustrates a lens 550 that includes reflection holograms 556, transmission hologram 554, and projection holograms 552, according to some embodiments. Lens 550 may be a piece of curved glass or plastic with optical power depending on the user's particular requirements, or alternatively a piece of flat or curved glass or plastic with no optical power. In some embodiments, the lens 550 may be mounted in an eyeglass frame. One or both surfaces of the lens 550 may be coated with at least one layer of a holographic medium or film. In some embodiments, one or more of the holographic layers may be embedded in the lens 550. In this example, an inner (eye-facing) surface of lens 550 includes two holographic layers in which transmission holograms 554 and projection holograms 552 are recorded. An outer (world-facing) surface of lens 550 includes a holographic layer in which reflection holograms 556 are recorded. In some embodiments, the transmission holograms 554 may be recorded to diffract a range of wavelengths from the green (495-570 nm) portion of the visible light spectrum to the scene camera. However, the transmission holograms may be recorded to diffract light within other portions or ranges of the visible light spectrum to the scene camera. In some embodiments, the reflection holograms 556 may be recorded to reflect the same range of wavelengths that the transmission holograms 554 are recorded to diffract.

FIG. 5B illustrates a band-pass filter 540, according to some embodiments. Band-pass filter 540 may be tuned to block all wavelengths other than the transmission hologram 554 wavelength. The combination of the band-pass filter 540 and reflection holograms 556 block substantially all of the unwanted direct light from reaching the scene camera while still allowing the target wavelength of light diffracted by the transmission holograms 554 to reach the photosensor of the scene camera unhindered to form a clean image of the scene in the target wavelength that can be captured and processed.

FIGS. 6A and 6B illustrate components of a scene camera for an MR system that captures multiple wavelengths, according to some embodiments. FIG. 6A illustrates a lens 650 that includes reflection holograms 556 and transmission holograms 554 for multiple wavelengths, according to some embodiments. Lens 650 may be a piece of curved glass or plastic with optical power depending on the user's particular requirements, or alternatively a piece of flat or curved glass or plastic with no optical power. In some embodiments, the lens 650 may be mounted in an eyeglass frame. One or both surfaces of the lens 650 may be coated with at least one layer of a holographic medium or film. In some embodiments, one or more of the holographic layers may be embedded in the lens 650. In this example, an inner (eye-facing) surface of lens 650 includes four holographic layers in which transmission holograms 654 and projection holograms 652 are recorded. An outer (world-facing) surface of lens 650 includes three holographic layers in which reflection holograms 656 are recorded.

In some embodiments, each transmission hologram 654 layer may be recorded to diffract different range of wavelengths to the scene camera. For example in some embodiments, a first layer R of holograms 654 may diffract a portion of the light from the red portion of the visible light spectrum, a second layer G of holograms 654 may diffract a portion of the light from light from the green portion of the visible light spectrum, and a third layer B of holograms 654 may diffract a portion of the light from light from the blue portion of the visible light spectrum. Thus, the scene camera may capture RGB images of the scene. Note that the diffracted ranges of wavelengths may be narrow so that most of the visible light is allowed to pass directly through the lens 650 to the user's eye so that the user has a relatively unaffected view of the environment through the lens 650.

In some embodiments, the reflection holograms 656 may be recorded to reflect the same ranges of wavelengths that the transmission holograms 654 are recorded to diffract. For example in some embodiments, a first layer R of holograms 656 may reflect a portion of the light from the red portion of the visible light spectrum, a second layer G of holograms 656 may reflect a portion of the light from light from the green portion of the visible light spectrum, and a third layer B of holograms 656 may reflect a portion of the light from light from the blue portion of the visible light spectrum.

FIG. 6B illustrates a band-pass filter 640, according to some embodiments. Band-pass filter 640 may be tuned to block all wavelengths other than the transmission hologram 554 wavelengths. For example in some embodiments, band-pass filter 640 may block all wavelengths of light that are outside the red R portion of the visible light spectrum diffracted by a first layer R of holograms 654, the green G portion of the visible light spectrum diffracted by a second layer G of holograms 654, and the blue B portion of the visible light spectrum diffracted by a third layer B of holograms 654. The combination of the band-pass filter 640 and reflection holograms 656 block substantially all of the unwanted direct light from reaching the scene camera while still allowing the target wavelengths of light diffracted by the transmission holograms 554 to reach the photosensor of the scene camera unhindered to form a clean image of the scene that includes the target wavelengths that can be captured and processed.

Example Direct Retinal Projector MR Systems

FIGS. 7 and 8 illustrate architecture, components, and operation of example embodiments of direct retinal projector MR systems that may include embodiments of a scene camera as described herein. Note, however, that embodiments of the scene camera may be used in other applications.

FIG. 7 illustrates an example mixed reality (MR) system 700 that uses projection holograms recorded in a holographic medium on a lens 750 to direct light projected by multiple projectors 712 into a user's eye 790, while also transmitting light from the environment to the user's eye 790, according to some embodiments. In some embodiments, the MR system 700 may include a headset (e.g., a helmet, goggles, or glasses as shown in FIG. 6) that includes a frame 701, multiple projectors 712 (three, for example), a gaze tracker 720, an embodiment of a scene camera 730 with band-pass filter 740 as described herein, and a lens 750 that includes one or more layers of holographic film on either side of, or embedded in, the lens 750. The lens 750 may be a piece of curved glass or plastic with optical power depending on the user's particular requirements, or alternatively a piece of flat or curved glass or plastic with no optical power. The layers of holographic film may be recorded with reflection holograms 756, transmission holograms 754, and projection holograms 752 as described herein. To achieve a more accurate representation of the perspective of the user, instead of locating the scene camera on the MR headset to capture a direct view of the scene as shown in FIG. 1, the scene camera 730 is located on the side of the MR headset (at the temple side of the user's eye) and facing the inside surface of the lens 750. Note that, for simplicity, the system 700 is shown for only one eye; generally but not necessarily, there will be projectors 712, a gaze tracker 720, and a lens 750 for the second eye.

In some embodiments, the MR system 700 may also include a separate control box 702 that includes multiple light sources 710 (three, for example), and a controller 704 and power supply 706 for the MR system 700. The light sources 710 may, for example, be RGB lasers. The control box 702 may, for example, be worn on the user's hip, or otherwise carried or worn by the user. The light sources 710 may be coupled to the projectors 712 by fiber optic cables, with each light source 710 coupled to one projector 712. In some embodiments, the control box 702 may include separate sets of light sources 710 for each eye 790, with the light sources 710 for each eye connected to the projectors 712 on respective sides of the frame 701 by fiber optic cables. The light sources 710, fiber optic cables, and projectors 712 for an eye 790 may be referred to as a light engine. Thus, the system 700 may include two light engines, with one for each eye.

The controller 704 may control operation of the light engine(s). The controller 704 may be integrated in the control box 702, or alternatively may be implemented at least in part by a device (e.g., a personal computer, laptop or notebook computer, smartphone, pad or tablet device, game controller, etc.) coupled to the control box 702 via a wired or wireless (e.g., Bluetooth) connection. The controller 704 may include one or more of various types of processors, CPUs, image signal processors (ISPs), graphics processing units (GPUs), coder/decoders (codecs), memory, and/or other components. The controller 704 may, for example, generate virtual content for projection by the light engine(s). The controller 704 may also direct operation of the light engine(s), in some embodiments based at least in part on input from a gaze tracking 720 component(s) of the headset. The gaze tracking 720 component(s) may be implemented according to any of a variety of gaze tracking technologies, and may provide gaze tracking input to the controller 704 so that projection by the light engine(s) can be adjusted according to current position of the user's eye(s) 790. For example, different ones of the light sources 710 and projectors 712 may be activated to project light onto different eye box 760 points based on the current position of the user's eyes.

In some embodiments, the lens 750 may include a holographic medium (e.g., holographic film) recorded with a series of point to point projection holograms 752; one projection point interacts with multiple projection holograms 752 to project light onto multiple eye box 760 points. In some embodiments, the projection holograms 752 are arranged so that neighboring eye box 760 points are illuminated from different projectors 712. In some embodiments, the projection holograms 752 and projectors 712 of light engine may be arranged to separately project light fields with different fields of view and resolution that optimize performance, system complexity and efficiency, so as to match the visual acuity of the eye.

In some embodiments, the light engine may include multiple independent light sources 710 (e.g., laser diodes, LEDs, etc.) that may emit light beams, under control of the controller 704, that are independently projected by respective projectors 712. In some embodiments, there may be three light sources 710 coupled to three projectors 712 by three fiber-optic cables; however, there may be more or fewer light sources 710, projectors 712, and connecting cables in some embodiments. In some embodiments, the projectors 712 may each include a two-axis scanning mirror (e.g., a MEMS mirror) that scans the light beam from a respective light source 710 to the projection holograms 752 on lens 750. The light sources 710 may be appropriately modulated (e.g., by controller 704) to generate a desired image. In some embodiments, only one light source 710 and projector 712 (per eye) is active at a given time; when activated, a projector 712 projects light from a corresponding light source 710 (e.g., an RGB laser) to all of its eye box 760 points. However, in some embodiments, more than one light source 710 and projector 712, or all of the light sources 710 and projectors 712, may be active at the same time.

In some embodiments, each projector 712 may include optical elements that focus the light beam before scanning such that, once reflected by the projection holograms 752 of lens 750, the light is substantially collimated when it enters the user's eye 790. In some embodiments, each projector 712 may also include an active focusing element that may, for example, be used to change focus of the light beam as the light beam is scanned across a slow (horizontal) axis by the scanning mirror. Active focusing may also enable beams that diverge into the eye to, rather than being collimated, match the beam divergence of the supposed depth of the virtual object(s) being projected.

Scene camera 730 is located on the side of the MR headset (at the temple side of the user's eye) and facing the inside surface of the lens 750. The transmission holograms 754 diffract a portion of the light from the scene (e.g., s range of wavelengths from the green portion of the visible light spectrum) that is directed to the user's eye 790 to the scene camera 730. Thus, the scene camera 730 captures images of the environment from substantially the same perspective as the user's eye 790. The captured images may, for example, be analyzed by controller 704 to locate edges and objects in the scene. In some embodiments, the images may also be analyzed to determine depth information for the scene. The information obtained from the analysis may, for example, be used by controller 704 to place the virtual content in appropriate locations in the mixed view of reality provided by the MR system 700.

To stop unwanted direct light from reaching the scene camera 730, a band-pass filter 740 is tuned to the transmission hologram 754 wavelength to block all direct view wavelengths other than the transmission hologram 754 operating wavelength. In addition, reflection holograms 756 are tuned to the same wavelength as the transmission holograms 754. The reflection holograms 756 reflect the light within that wavelength at direct view angles. The combination of the band-pass filter 740 and reflection holograms 756 thus block the unwanted direct view while still allowing the desired image of the scene to reach the photosensor of the scene camera 730 unhindered. The reflection holograms 754 also prevent the portion of the direct light to the scene camera 730 corresponding to the target wavelength from being diffracted to the user's eye 790 by the transmission holograms 754, as the target wavelength incident from the direct view is reflected by holograms 756 before reaching transmission holograms 754.

In some embodiments, instead of light sources located in a control box that are coupled to projectors via fiber optic cables as illustrated in FIG. 7, the light sources may instead be coupled directly to the projectors in an on-frame unit. FIG. 8 illustrates an embodiment of an MR system in which the projectors and light sources are contained in an on-frame unit. In these embodiments, the MR system 800 may include a headset (e.g., a helmet, goggles, or glasses) that includes a frame 801, an on-frame unit including multiple light sources 810 (three, for example) coupled to projectors 812 (three, for example), a gaze tracker 820, an embodiment of a scene camera 830 with band-pass filter 840 as described herein, and a lens 850 that includes one or more layers of holographic film on either side of, or embedded in, the lens 850. The lens 850 may be a piece of curved glass or plastic with optical power depending on the user's particular requirements, or alternatively a piece of curved glass or plastic with no optical power. The layers of holographic film may be recorded with reflection holograms 856, transmission holograms 854, and projection holograms 852 as described herein. To achieve a more accurate representation of the perspective of the user, instead of locating the scene camera on the MR headset to capture a direct view of the scene as shown in FIG. 1, the scene camera 830 is located on the side of the MR headset (at the temple side of the user's eye) and facing the inside surface of the lens 850. Note that, for simplicity, the system 800 is shown for only one eye; generally but not necessarily, there will be light sources 810, projectors 812, a gaze tracker 820, and a lens 850 for the second eye. The on-frame unit 802 may also include a controller 804 and a power supply (not shown). Alternatively, the controller 804 and/or power supply may be implemented in a separate unit or device that is coupled to the on-frame unit via a physical cable and/or a wireless connection.

In some embodiments, the system 800 may include multiple independent light sources 810 (e.g., laser diodes, LEDs, etc.) that may emit light beams, under control of the controller 804, that are independently projected by respective projectors 812. In some embodiments, there may be three light sources 810A-810C coupled to three projectors 812A-812C; however, there may be more or fewer light sources and projectors in some embodiments. In some embodiments, each projector 812 may scan a light beam from a respective light source 810 to projection holograms 852 of the lens 850. The light sources 810 may be appropriately modulated (e.g., by controller 804) to generate a desired image. In some embodiments, only one light source 810 and projector 812 (per eye) is active at a given time; when activated, a projector 812 projects light from a corresponding light source 810 (e.g., an RGB laser) to all of its eye box 860 points. However, in some embodiments, more than one light source 810 and projector 812, or all of the light sources 810 and projectors 812, may be active at the same time.

Scene camera 830 is located on the side of the MR headset (at the temple side of the user's eye) and facing the inside surface of the lens 850. The transmission holograms 854 diffract a portion of the light from the scene (e.g., s range of wavelengths from the green portion of the visible light spectrum) that is directed to the user's eye 890 to the scene camera 830. Thus, the scene camera 830 captures images of the environment from substantially the same perspective as the user's eye 890. The captured images may, for example, be analyzed by controller 804 to locate edges and objects in the scene. In some embodiments, the images may also be analyzed to determine depth information for the scene. The information obtained from the analysis may, for example, be used by controller 804 to place the virtual content in appropriate locations in the mixed view of reality provided by the MR system 800.

To stop unwanted direct light from reaching the scene camera 830, a band-pass filter 840 is tuned to the transmission hologram 854 wavelength to block all direct view wavelengths other than the transmission hologram 854 operating wavelength. In addition, reflection holograms 856 are tuned to the same wavelength as the transmission holograms 854. The reflection holograms 856 reflect the light within that wavelength at direct view angles. The combination of the band-pass filter 840 and reflection holograms 856 thus block the unwanted direct view while still allowing the desired image of the scene to reach the photosensor of the scene camera 830 unhindered. The reflection holograms 854 also prevent the portion of the direct light to the scene camera 830 corresponding to the target wavelength from being diffracted to the user's eye 890 by the transmission holograms 854, as the target wavelength incident from the direct view is reflected by holograms 856 before reaching transmission holograms 854.

Figure 9:
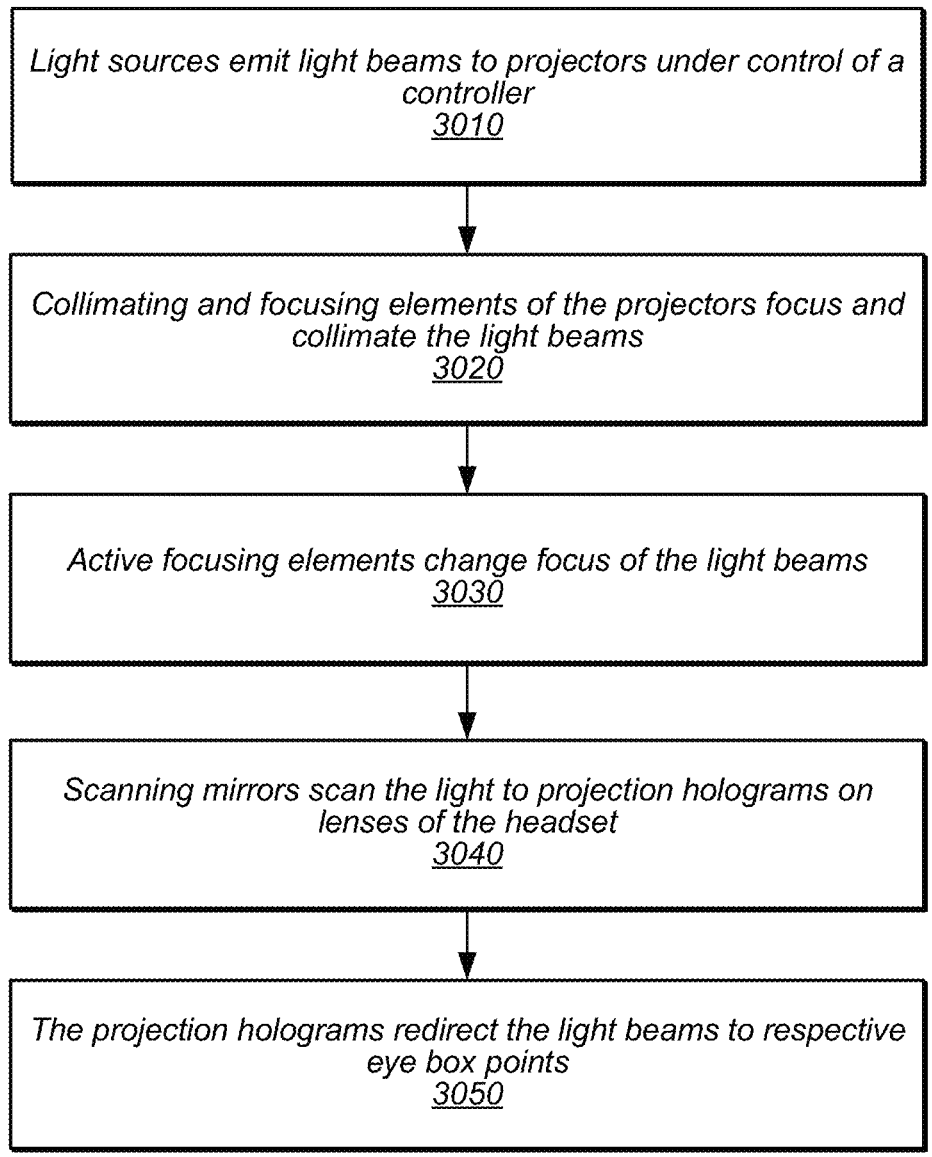
FIG. 9 is a high-level flowchart of a method of operation for an MR system as illustrated in FIGS. 7 and 8, according to some embodiments.

FIG. 9 is a high-level flowchart of a method of operation for an MR system as illustrated in FIGS. 7 and 8, according to some embodiments. As indicated at 3010, light sources (e.g., RGB lasers) emit light beams to projectors under control of a controller. In some embodiments, the light sources may be located in a control box and coupled to the projectors by fiber optic cables, for example as illustrated in FIG. 7. Alternatively, in some embodiments, the light sources may be coupled directly to the projectors in an on-frame unit, for example as illustrated in FIG. 8. As indicated at 3020, collimating and focusing optic elements of the projectors refract the light to focus and collimate the light beams. As indicated at 3030, active focusing elements of the projectors may change the focus of the light beams. As indicated at 3040, scanning mirrors (e.g., 2D scanning microelectromechanical systems (MEMS) mirrors) of the projectors scan the light beams to projection holograms on lenses of the headset. As indicated at 3050, the projection holograms redirect the light beams to respective eye box points. In some embodiments, the user's pupil position may be tracked by a gaze tracking component, and the MR system may selectively illuminate different eye box points according to the tracking information by selectively activating different ones of the light sources and projectors.

FIG. 10 is high-level flowchart of a method of operation of an MR system as illustrated in FIGS. 7 and 8 that includes a scene camera as illustrated in FIGS. 2 through 6, according to some embodiments. As indicated at 3110, a portion of the direct light from a scene to the eye is diffracted to the scene camera by transmission holograms of the lens; unwanted direct light is blocked by reflection holograms on the lens and by a band-pass filter of the scene camera. As indicated at 3120, the scene camera captures images of the scene and sends the images to a controller. As indicated at 3130, the controller analyzes the images, for example to locate objects and surfaces in the scene. As indicated at 3140, the controller generates virtual content based at least in part on information about the scene determined from the images and sends the virtual content to the light engine. As indicated at 3150, the light engine scans light beams to projection holograms of the lens. As indicated at 3160, the projection holograms redirect the light beams to respective eye box points to form a mixed reality view that includes the virtual content placed appropriately in the user's view of the real environment.

Figure 11:
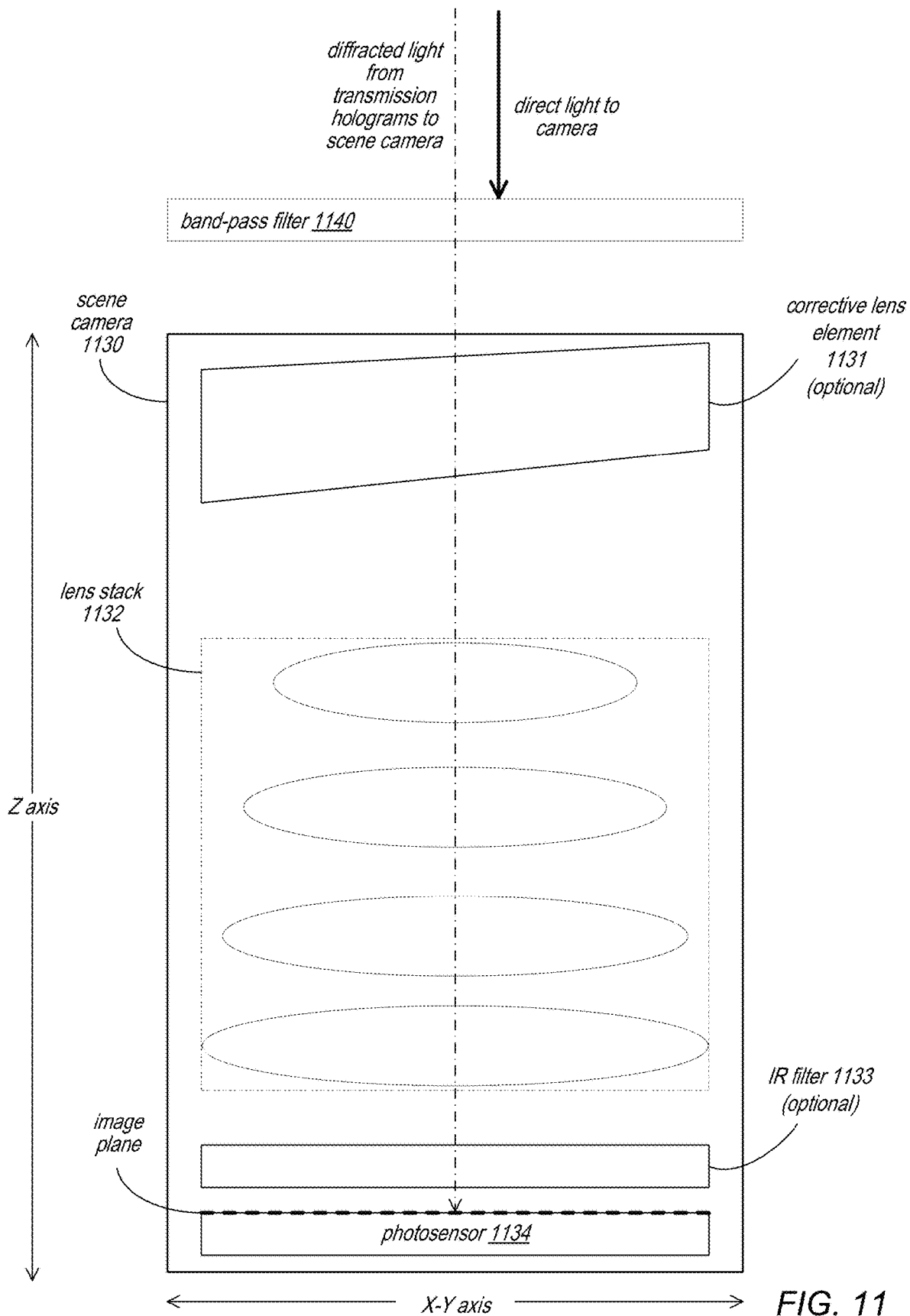
FIG. 11 illustrates an example scene camera, according to some embodiments.

FIG. 11 illustrates an example scene camera, according to some embodiments. The scene camera 1130 may be a small form factor camera with X, Y, and Z axis dimensions of a few millimeters (as a non-limiting example, 6×6×12 mm) suitable for use on an MR headset worn by a user. The scene camera 1130 may be coupled to a controller of the MR headset by a wired or wireless connection. The scene camera 1130 may include, but is not limited to, a small form factor lens stack 1132 that includes one or more refractive lens elements and a photosensor 1134. In some embodiments, a band-pass filter 1140 may be located at or in front of the scene camera 1130 to block all wavelengths of light from reaching the scene camera 1130 except for the portion of the wavelengths of light that is diffracted by the transmission holograms. The refractive lens elements in lens stack 1132 refract the diffracted light from the transmission holograms to form an image at an image plane at or near a surface of the photosensor 1134. The refractive lens elements in lens stack 1132 may include lenses of various shapes, sizes, refractive powers, and/or optical materials. For example, the lens elements may include positive lenses, negative lenses, biconvex lenses, biconcave lenses, meniscus lenses, and/or lenses with at least one aspheric surface. In some embodiments, the scene camera 1130 may also include a corrective lens element 1131 (e.g., a wedge lens) located in front of the lens stack 1132 to correct aberrations introduced by the transmission holograms. In some embodiments, the scene camera 1130 may also include an infrared (IR) filter 1133, for example located between the lens stack 1132 and the photosensor 1134.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
   a headset, comprising:
      a lens with a plurality of layers of a holographic medium on at least one surface of or embedded in the lens; and
      a scene camera located on a side of the headset and facing an inside surface of the lens;
      wherein at least one of the plurality of layers of the holographic medium is recorded with transmission holograms that diffract a portion of wavelengths of direct light from a scene to a user's eye to the scene camera so that the scene camera views the scene from substantially a same perspective as the user's eye views the scene through the lens; and
      wherein at least another one of the plurality of layers of the holographic medium is recorded with reflection holograms that are tuned to the same portion of wavelengths of light that is diffracted by the transmission holograms and that reflect a portion of direct light from the scene to the scene camera within the portion of wavelengths.

2. The system as recited in claim 1, further comprising a band-pass filter located at or in front of the scene camera, wherein the band-pass filter blocks all wavelengths of light from reaching the scene camera except for the portion of the wavelengths of light that is diffracted by the transmission holograms.

3. The system as recited in claim 1, wherein the portion of the wavelengths of light that is diffracted by the transmission holograms include a range of wavelengths from the green portion of the visible light spectrum.

4. The system as recited in claim 1, wherein the portion of the wavelengths of light that is diffracted by the transmission holograms include ranges of wavelengths from the red, green, and blue portions of the visible light spectrum.

5. The system as recited in claim 1, wherein the scene camera comprises:
   a photosensor; and
   one or more refractive lens elements that refract the light diffracted by the transmission holograms to form an image of the scene at an image plane at or near a surface of the photosensor.

6. The system as recited in claim 1, wherein the scene camera further comprises a corrective lens element located in front of the refractive lens elements that corrects aberrations introduced by the transmission holograms.

7. The system as recited in claim 1,
   wherein the scene camera is configured to:
      capture images of the scene from substantially the same perspective as the user's eye views the scene through the lens; and
      provide the captured images to a controller for the headset;
   wherein the controller is configured to:
      analyze the captured images to determine information about the scene; and
      use the determined information about the scene to place virtual content in appropriate locations in a mixed view of reality provided by the system.

8. The system as recited in claim 1, wherein at least one layer of the holographic medium is recorded with point-to-point projection holograms, and wherein the system further comprises:
   a controller comprising one or more processors; and
   a light engine that emits light beams to the projection holograms under control of the controller;
   wherein the projection holograms redirect the light beams received from the light engine to an eye box corresponding to the user's eye.

9. The system as recited in claim 8, wherein the light engine comprises:
   a plurality of light sources that emit the light beams under control of the controller; and
   a plurality of projectors located on the side of the headset and facing the inside surface of the lens, each projector coupled to one of the light sources, wherein each projector scans the light beam emitted by the respective light source to the projection holograms.

10. The system as recited in claim 9, wherein the system further comprises a control box coupled to the headset by a wired or wireless connection that includes the plurality of light sources and the controller.

11. The system as recited in claim 9, wherein the headset includes the plurality of light sources and the controller.

12. The system as recited in claim 8, wherein the system includes a lens with one or more layers of a holographic medium recorded with transmission holograms and projection holograms, a scene camera, and a light engine for each of the user's eyes, wherein the light engine and projection holograms for a given eye project light to an eyebox corresponding to that eye.

13. A method, comprising:
   diffracting, by transmission holograms recorded in a holographic film on a lens, a portion of wavelengths of direct light from a scene to a user's eye to a scene camera;
   capturing, by the scene camera, an image of the scene;
   providing, by the scene camera, the captured image of the scene to a controller comprising one or more processors;
   analyzing, by the controller, the image to determine information about the scene including locations of objects in the scene;
   generating, by the controller, virtual content based at least in part on the information about the scene determined from the images;
   sending, by the controller, the virtual content to a light engine;
   scanning, by the light engine, light beams to projection holograms recorded in a holographic film on the lens; and
   redirecting, by the projection holograms, the light beams from the light engine to an eye box corresponding to the user's eye to form a mixed reality view that includes the virtual content placed appropriately in the user's view of the real environment as viewed through the lens.

14. The method as recited in claim 13, further comprising blocking, by a band-pass filter located at or in front of the scene camera, all wavelengths of light from reaching the scene camera except for the portion of the wavelengths of light that is diffracted by the transmission holograms.

15. The method as recited in claim 14, further comprising reflecting, by reflection holograms recorded in a holographic film on the lens that are tuned to the same wavelengths of light that is diffracted by the transmission holograms, a portion of direct light from the scene to the scene camera within those wavelengths.

16. The method as recited in claim 13, wherein the portion of the wavelengths of light that is diffracted by the transmission holograms include a range of wavelengths from the green portion of the visible light spectrum.

17. The method as recited in claim 13, wherein the portion of the wavelengths of light that is diffracted by the transmission holograms include ranges of wavelengths from the red, green, and blue portions of the visible light spectrum.

18. The method as recited in claim 13, wherein the lens, the scene camera, the controller, and the light engine are components of a headset configured to be worn on the head of the user.

19. The method as recited in claim 13, further comprising correcting, by a corrective lens element located in front of the scene camera, aberrations introduced by the transmission holograms.

20. A lens for a mixed reality (MR) system, comprising:
a plurality of layers of a holographic medium on at least one surface of or embedded in the lens;
wherein at least one of the layers of the holographic medium is recorded with transmission holograms that diffract a portion of wavelengths of direct light from a scene to a user's eye to a scene camera so that the scene camera views the scene from substantially a same perspective as the user's eye views the scene through the lens;
wherein at least one layer of the plurality of layers of the holographic medium is recorded with reflection holograms that are tuned to the same wavelengths of light that is diffracted by the transmission holograms and that reflect a portion of direct light from the scene to the scene camera within those wavelengths; and
wherein at least another one layer of the plurality of layers of the holographic medium is recorded with projection holograms that redirect light beams received from a light engine of the MR system to an eye box corresponding to a user's eye.

* * * * *